(12) United States Patent
Ito et al.

(10) Patent No.: US 8,461,470 B2
(45) Date of Patent: Jun. 11, 2013

(54) METHOD OF MEASURING DEGRADATION CONDITION OF OUTPUT MIRROR IN LASER OSCILLATOR AND LASER MACHINING APPARATUS

(75) Inventors: Kenji Ito, Chiyoda-ku (JP); Takamitsu Kimura, Nagoya (JP); Osami Yamaoka, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 356 days.

(21) Appl. No.: 12/741,930

(22) PCT Filed: Nov. 20, 2007

(86) PCT No.: PCT/JP2007/072452
§ 371 (c)(1),
(2), (4) Date: May 7, 2010

(87) PCT Pub. No.: WO2009/066370
PCT Pub. Date: May 28, 2009

(65) Prior Publication Data
US 2010/0245830 A1    Sep. 30, 2010

(51) Int. Cl.
*G01N 21/55* (2006.01)
(52) U.S. Cl.
USPC ............. 219/61; 219/62; 219/67; 219/71; 219/73; 356/447
(58) Field of Classification Search
USPC ........... 219/121.61, 62, 67, 68, 69, 72, 73, 219/74, 75, 83, 7, 71, 76, 78; 356/447
See application file for complete search history.

(56) References Cited

U.S. PATENT DOCUMENTS 5,698,120 A * 12/1997 Kurosawa et al. ....... 219/121.62
5,938,954 A *  8/1999 Onuma et al. ........... 219/121.84
(Continued)

FOREIGN PATENT DOCUMENTS

CN       1665080 A    9/2005
CN    101017955 A    8/2007
(Continued)

OTHER PUBLICATIONS

Office Action issued Jan. 19, 2012 by the Korean Patent Office.
(Continued)

*Primary Examiner* — Minh-Loan T Tran
*Assistant Examiner* — Fazli Erdem
(74) *Attorney, Agent, or Firm* — Sughrue Mion, PLLC

(57) ABSTRACT

In a laser machining apparatus that performs machining by a laser beam (4) emitted from a laser oscillator (1), the laser machining apparatus herein provided includes an aperture (5) placed in a light path of the laser beam (4) emitted from the laser oscillator (1) so as to block a perimeter portion of the laser beam (4) and to transmit a middle portion thereof, and a beam-power measurement sensor (6) for measuring beam power of a laser beam (20) transmitted through the aperture (5), whereby it utilizes that beam power of the laser beam transmitted through the aperture (5) significantly changes (the more degraded, the more the beam power rises) due to a degradation condition of an output mirror (2) when the output mirror in the laser oscillator (1) becomes in high thermal loading condition due to the laser beam with high beam power, so that the degradation condition of the output mirror (2) is determined.

22 Claims, 19 Drawing Sheets

U.S. PATENT DOCUMENTS

| | | | |
|---|---|---|---|
| 5,963,374 A | * | 10/1999 | Endou et al. .................. 359/641 |
| 5,991,319 A | * | 11/1999 | Zamel et al. .................... 372/34 |
| 6,260,976 B1 | * | 7/2001 | Endou et al. .................. 359/846 |
| 6,635,849 B1 | * | 10/2003 | Okawa et al. ............ 219/121.73 |
| 7,680,163 B2 | * | 3/2010 | Shida et al. ..................... 372/34 |

FOREIGN PATENT DOCUMENTS

| | | |
|---|---|---|
| JP | 03-240282 A | 10/1991 |
| JP | 07-245437 A | 9/1995 |
| JP | 2000-012923 A | 1/2000 |
| JP | 2005-175245 A | 6/2005 |

OTHER PUBLICATIONS

Chinese Office Action dated Oct. 9, 2012 issued in corresponding Chinese Patent Application No. 200780101632.5.

* cited by examiner

TEMPERATURE RISE DUE
TO DEGRADATION

Fig. 9

| OUTPUT MIRROR DEGRADATION INDEX (%) | AMOUNT OF FOCUSING POSITION CHANGE (mm) |
|---|---|
| 5 | 0.1 |
| 10 | 0.1 |
| 15 | 0.4 |
| 20 | 0.8 |
| 25 | 1.3 |
| 30 | 2.0 |
| 35 | 2.9 |
| 40 | 3.7 |
| 45 | 5.0 |
| 50 | 5.9 |
| 55 | 7.3 |
| 60 | 9.2 |
| 65 | 10.2 |
| 70 | 11.3 |
| 75 | 12.8 |
| 80 | 14.1 |
| 85 | 15.6 |
| 90 | 16.7 |
| 95 | 17.7 |
| 100 | 18.8 |

Fig. 10

| MACHINING MATERIAL | FOCUSING TOLERANCE (mm) |
|---|---|
| STAINLESS STEEL | 6mm |
| IRON | 3mm |
| ALUMINUM | 6mm |

Fig. 15

| OPENING DIAMETER OF APERTURE (mm) | HIGH THERMAL LOADING BEAM-POWER (W) | BEAM-POWER CRITERION VALUE (W) | OUTPUT MIRROR DEGRADATION INDEX (%) |
|---|---|---|---|
| 1.5 | 9.2 | 5.4 | 70.4 |
| 2.0 | 16.3 | 9.6 | 69.8 |
| 2.5 | 25.0 | 15.0 | 66.7 |
| 3.0 | 28.0 | 16.7 | 67.6 |
| 3.5 | 38.4 | 29.4 | 30.6 |
| 4.0 | 48.1 | 38.4 | 25.3 |
| 4.5 | 52.5 | 48.6 | 8.0 |
| APERTURE IS ABSENT | 58.0 | 60.0 | 4.5 |

METHOD OF MEASURING DEGRADATION CONDITION OF OUTPUT MIRROR IN LASER OSCILLATOR AND LASER MACHINING APPARATUS

TECHNICAL FIELD

The present invention relates to a measurement method of measuring a degradation condition of a partially reflecting mirror in a laser oscillator and to a laser machining apparatus therefor.

BACKGROUND ART

A laser beam emitted from a laser oscillator is excellent in its directivity and light-focusing capability so that it is easy to focus the laser beam into a minute spot by lenses and/or mirrors and is possible to obtain high energy density. For this reason, the laser oscillator is utilized widely in the field of machining such as cutting, drilling, welding or thermal processing in recent years.

The laser oscillator is generally constituted of one partially reflecting mirror (hereinafter referred to as an "output mirror") placed on its side from which a laser beam is emitted, and of other mirror(s) being one or a plurality of totally reflecting mirror(s), to thereby cause oscillation on the principle that a laser beam is amplified for emission by multiply reflecting between the mirrors. When the laser oscillator is used for long hours, absorption of the laser beam will occur in the mirrors placed in the laser oscillator because of degradation of mirror coating layer or degradation of mirror material itself, causing nonuniform temperature distribution within the mirrors. The nonuniform temperature distribution results in nonuniform refractive index distribution, causing changes in laser-beam properties or reduction in beam power of the laser beam; therefore, in order to maintain machining quality, a regular cleanup and/or replacement of the mirrors placed in the laser oscillator, or so-called maintenance is required. In particular, because the output mirror allows transmission of a laser beam through it, the output mirror is, in comparison with other totally reflecting mirrors, likely to cause absorption of the laser beam and also difficult to be cooled from its back face, allowing its cooling only from its lateral side, so that nonuniform temperature distribution is likely to occur within the mirror.

For this reason, in order to maintain the machining quality, maintenance of the output mirror placed in the laser oscillator is conventionally performed based on a criterion time, that is empirically obtained as a guide, without measuring the mirror degradation condition.

DISCLOSURE OF THE INVENTION

Problems to be Solved by the Invention

In the maintenance described above, there is a problem in that no consideration is made to an individual variability in initial characteristic value of an optical component such as the absorptance of a laser beam, and to an individual variability that occurs in mirror degradation condition depending on an operating environment, an operating condition or the like. When mirror degradation progresses faster than a criterion time that serves as a guide for maintenance, a reduction in machining quality occurs before the maintenance, so that production should be stopped and an emergency maintenance is then be performed. Time is required for the maintenance, and furthermore, if arrangements for a replacement component and service personnel to conduct the work are delayed, a time-period to stop the production becomes longer, resulting in larger influence on the production line. When the mirror degradation progresses slower than the criterion time that serves as a guide for maintenance, the maintenance will be performed even though the machining quality is still good, resulting in truncating serviceable hours of the mirror, causing increase in maintenance expenses.

In addition, in order to avoid those problems regarding the emergency maintenance and increase in maintenance expenses described above, there is conventionally a case in which a laser apparatus is used that detects the laser beam diameter by a beam profile detector and measures quantitatively a degradation condition of the output mirror in accordance with the amount of change in the diameter with respect to its operation time (for example, refer to Patent Document 1).

[Patent Document 1]
Japanese Laid-Open Patent Publication No. H07-245437

However, in case of the conventional laser apparatus described above, the beam profile detector, that is an expensive measuring device, is required to detect the laser beam diameter, resulting in increase in system costs. In addition, an output-mirror degradation condition is measured in comparison with the laser beam diameter in its initial state, so that, if there is an initial abnormality such as degradation in the output mirror in its initial state, it is not possible to discover the abnormality at the point of time. Moreover, when the laser beam diameter is changed due to a determinant factor other than output-mirror degradation, such as degradation of a laser medium existing in the laser oscillator as a laser gas or the like, it is not possible to distinguish the determinant factor of the output mirror from the other factors.

The present invention has been directed at solving those problems described above, and a first object is to obtain a laser machining apparatus that is capable of measuring an output-mirror degradation condition with an inexpensive and simple configuration. A second object is to obtain a laser machining apparatus that is capable of measuring the output-mirror degradation condition and quantitatively evaluating an abnormality of the output mirror in its initial state, without performing a comparison with the laser beam diameter in its initial state.

Means for Solving the Problems

An evaluation device according to the present invention comprises a beam-power measurement sensor for measuring beam power of a laser beam emitted from a laser oscillator, an aperture placed between the laser oscillator and the beam-power measurement sensor for transmitting only a central portion of the laser beam, and a control device for quantifying a degradation condition of an output mirror, based on a measurement value of the beam-power measurement sensor in a predetermined thermal loading condition of the laser oscillator, whereby the evaluation of the output-mirror degradation condition is performed by oscillating a laser beam with high beam power to cause the output mirror to be in high thermal loading condition, and by measuring beam power of a laser beam transmitted through the aperture.

Effects of the Invention

The present invention enables quantitatively evaluating the output-mirror degradation condition with an inexpensive and simple configuration by changing the thermal loading condition for the laser oscillator and by measuring beam power of the laser beam transmitted through the aperture. According to the measurement method in the present invention, it becomes possible by regularly measuring the output-mirror degradation condition to prevent a reduction in machining quality before it otherwise happens.

BRIEF DESCRIPTION OF DRAWINGS

FIG. 9 is a table showing amounts of focusing position change of an output-mirror corresponding to its degradation indexes;

FIG. 10 is a table showing focusing tolerances in cutting machining for various materials;

FIG. 15 is a table showing the relationship between various opening diameters of the aperture and degradation indexes of an output mirror with its operation time of 4000 hours;

BEST MODE FOR CARRYING OUT THE INVENTION

Embodiment 1

Figure 1:
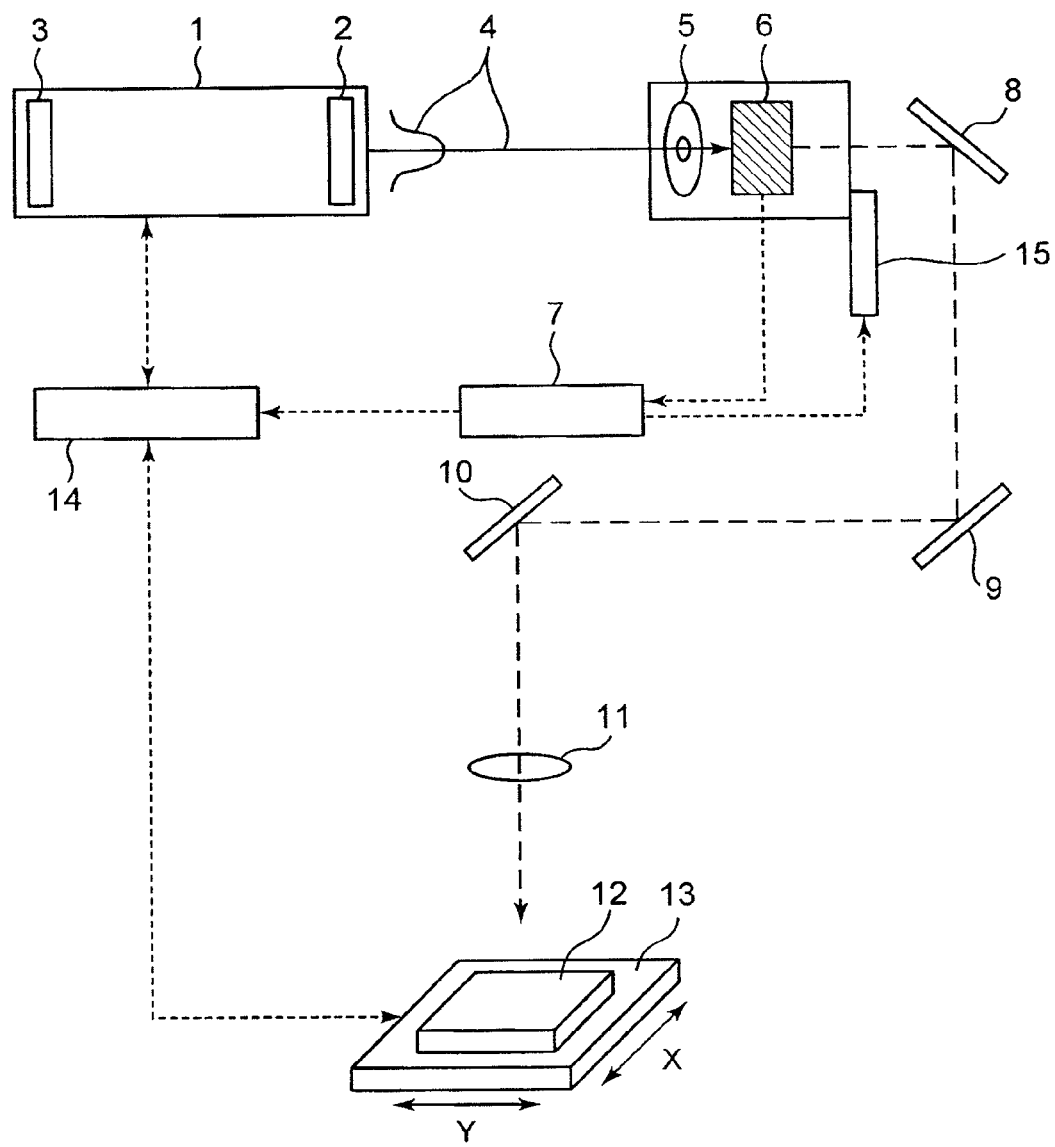
FIG. 1 is a diagram illustrating a configuration of a laser machining apparatus in Embodiment 1 of the present invention.
Figure 2:
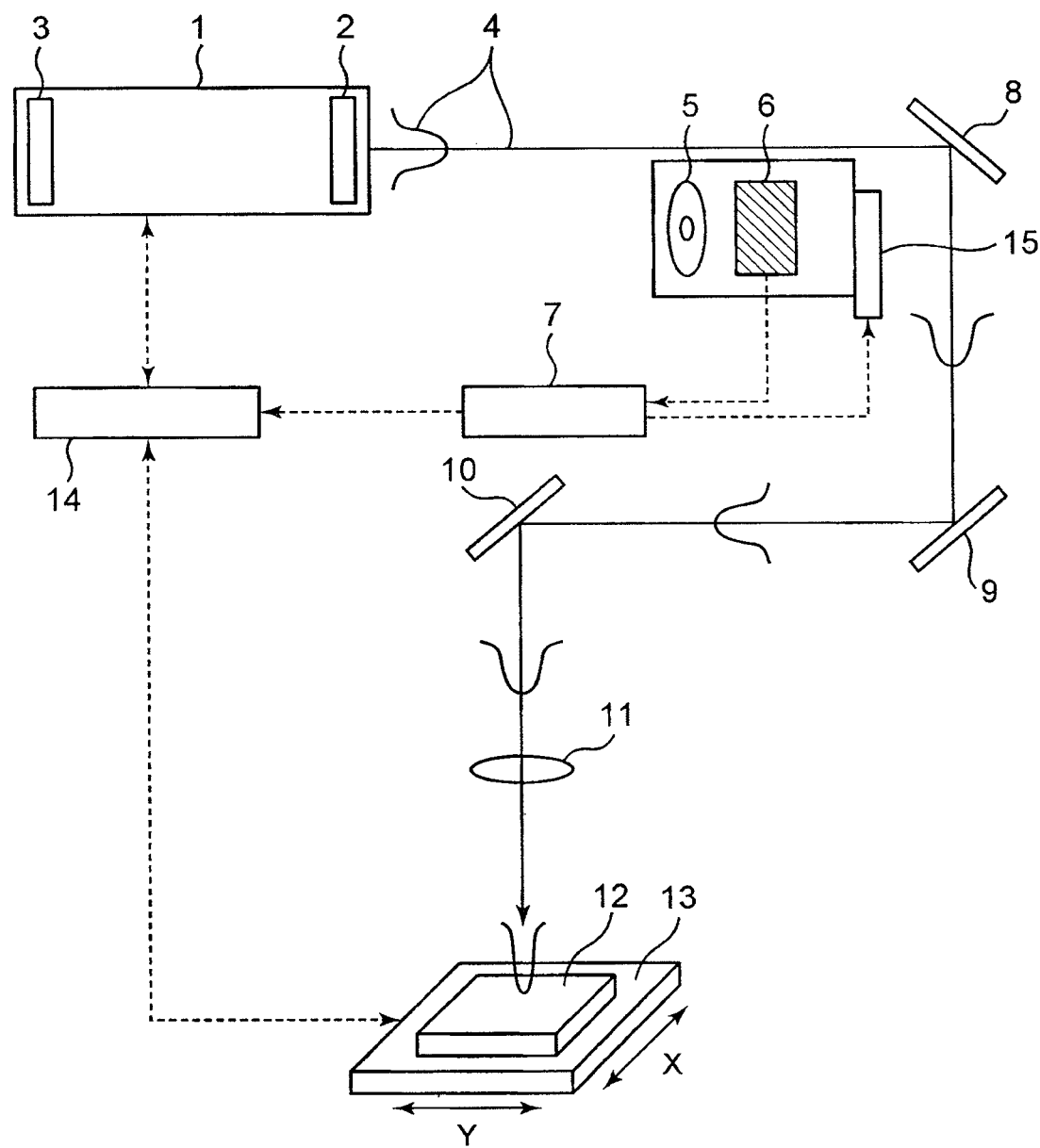
FIG. 2 is a diagram illustrating another configuration of the laser machining apparatus in Embodiment 1 of the present invention.

A method of measuring a degradation condition of an output mirror and a laser machining apparatus in Embodiment 1 of the present invention will be explained referring to FIG. 1 through FIG. 17. FIG. 1 and FIG. 2 illustrate the laser machining apparatus that is capable of measuring degradation of the output mirror in Embodiment 1 for carrying out the present invention. As illustrated in FIG. 1 and FIG. 2, the laser machining apparatus according to the embodiment includes a laser oscillator 1 having one output mirror 2 placed on the side from which a laser beam is emitted and other mirror(s) being one or a plurality (one, in this embodiment) of totally reflecting mirror(s) 3 to thereby constitute a resonator, a plurality of mirrors 8, 9 and 10 for transmitting a laser beam 4 emitted from the laser oscillator 1 toward a workpiece 12, a focusing lens 11 for focusing the transmitted laser beam 4 onto the workpiece 12, an X-Y table 13 to mount the workpiece 12 thereon for moving a laser-beam irradiation position at an arbitrary position on the workpiece 12, and a machining control device 14 for controlling the operations of the laser oscillator 1 and the X-Y table 13.

Moreover, in order to measure a degradation condition of the output mirror 2, included in the laser machining apparatus are a beam-power measurement sensor 6 for measuring beam power of the laser beam emitted from the laser oscillator 1, the aperture 5 for blocking a perimeter portion of the incident laser beam 4 to the beam-power measurement sensor 6 so as to allow transmission of a middle portion of the beam only, a drive device 15 for moving the beam-power measurement sensor 6 and the aperture 5 into or out of a laser-beam light path, and a measurement control device 7 for controlling the operations of the laser oscillator 1, the beam-power measurement sensor 6 and the drive device 15 when the degradation of the output mirror 2 is measured. The beam-power measurement sensor 6 and the aperture 5 are moved by the drive device 15 and the measurement control device 7 so as to be placed in the laser-beam light path of the laser machining apparatus as in FIG. 1 when the degradation condition of the output mirror 2 is measured, and they are placed out of the laser-beam light path as in FIG. 2 when machining the workpiece 12 is in progress. Here, the beam-power measurement sensor 6 may be of a simple structure to transform heat energy of the laser into a current or a voltage, thus it is not required to be an expensive measuring device such as a CCD for measuring an intensity distribution as described in Patent Document 1.

Note that, in a specific example of an optical system configuration of the laser machining apparatus according to Embodiment 1, the distance from the laser oscillator 1 to the aperture 5 is 700 mm, and the distance from the aperture 5 to the focusing lens 11 is 1300 mm. In addition, an opening diameter of the aperture 5 is set at φ2.5 mm that is 50% of the diameter φ5.0 mm of the laser beam 4 emitted from the laser oscillator 1, and the pulse width of the laser beam 4 is set at 1 ms. The laser beam diameter is defined as a laser beam diameter that corresponds to power of $1/e^2$ of the pulse peak power.

Here, with respect to the laser beam 4 emitted from the laser oscillator 1, relationships of a beam-power measurement value by the beam-power measurement sensor 6 with a changed pulse frequency, and with the presence or absence of the aperture 5 will be explained. The pulse peak power of the laser beam and its pulse width (1 ms) are set fixed.

Figure 3:
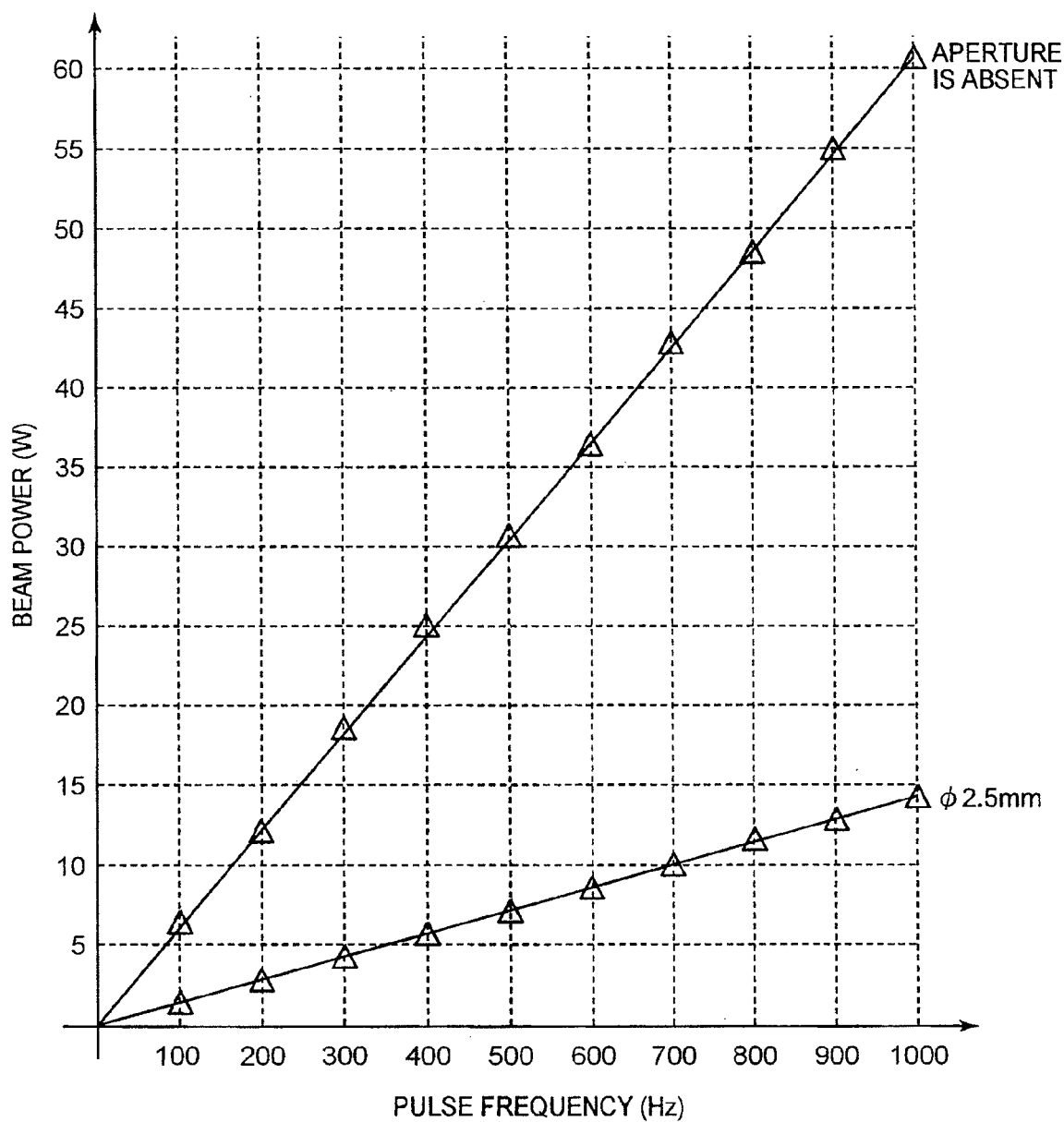
FIG. 3 is a graph showing a measurement result, using a non-degraded output mirror, on beam power of a laser beam when its pulse frequency is changed.

FIG. 3 is a measurement result by the beam-power measurement sensor 6 on beam power of a laser beam when the pulse frequency of the laser beam 4 is changed in increments of 100 Hz from 100 Hz to 1000 Hz, with respect to the presence or absence of the aperture 5. The reason for selecting pulse frequencies from 100 Hz to 1000 Hz in the laser machining apparatus described in the embodiment is that they correspond to the minimum and the maximum in beam power of the laser beam utilized for the laser machining. In particular, 1000 Hz is the value at which the pulse frequency cannot be increased any more because the pulse width is 1 ms resulting in a continuous emission at 1000 Hz. In addition, beam-power measurement of the laser beam is performed at the time of having reached the state of thermal equilibrium in which temperature of the output mirror will hardly change, and the measurement is thus performed about 10 seconds after the laser has been emitted, in the laser machining apparatus described in the embodiment. Note that, the output mirror 2 utilized is a new one that is not degraded. As is shown in FIG. 3, regardless of the presence and absence of the aperture 5, beam power of the laser beam changes in approximately direct proportion to the change in the pulse frequency. This is because the beam power of the laser beam is determined by the product of one-pulse energy of the laser beam and the pulse frequency. In addition, the perimeter portion of the laser beam 4 is blocked when the aperture 5 is present, and therefore the beam power of the laser beam is decreased correspondingly in comparison with the case in which it is absent, but the beam power changes in approximately direct proportion, similarly to the case when the aperture 5 is absent.

Figure 4:
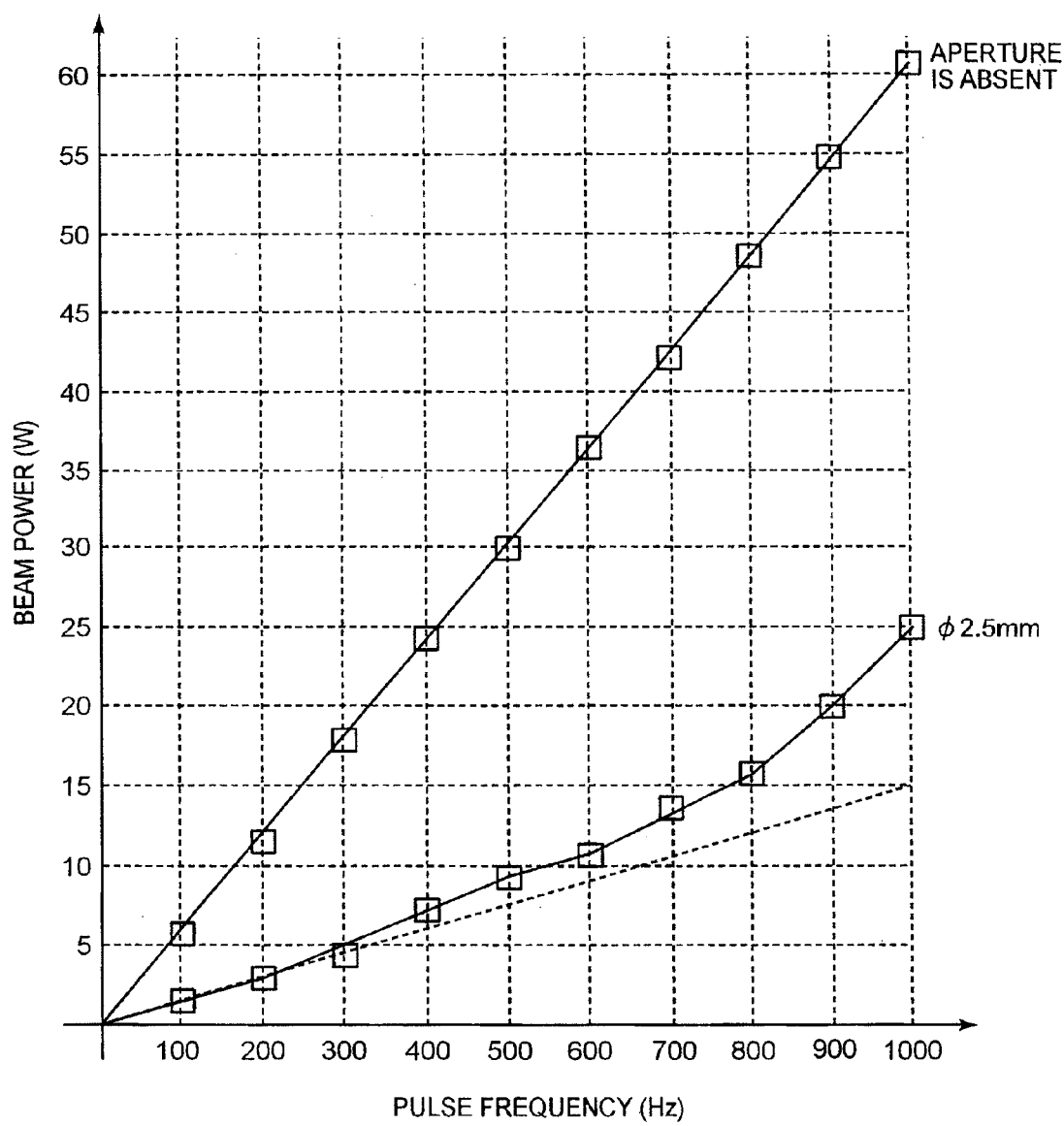
FIG. 4 is a graph showing a measurement result, using an output mirror with its operation time of 4000 hours, on beam power of a laser beam when its pulse frequency is changed.

Meanwhile, shown in FIG. 4, using a degraded output mirror 2 is a beam-power measurement result by the beam-power measurement sensor 6 when the pulse frequency of the laser beam 4 is changed in increments of 100 Hz from 100 Hz to 1000 Hz with respect to the presence or the absence of the aperture 5. As is shown in FIG. 4, the measurement result when the aperture 5 is absent is approximately the same as that of when the output mirror 2 is not degraded as in FIG. 3. However, it can be understood that the measurement result when the aperture 5 is present clearly differs from that in FIG. 3.

Hereinafter, the explanation will be made for the reasons why the difference occurs, when the aperture 5 is present, in the measurement values of beam power of the laser beam depending on the presence and absence of degradation of the output mirror 2.

When there is degradation of coating layer in the output mirror 2 or when there is degradation of mirror material itself, absorption of the laser beam 4 will occur in the output mirror 2, causing nonuniform temperature distribution in the output mirror 2. The nonuniform temperature distribution results in nonuniform refractive index distribution, causing changes in laser-beam properties or reduction in beam power of the laser beam. In general, because degradation is more likely to occur in the central portion of the output mirror 2 at which laser-beam intensity is higher, and also because the output mirror 2 is a partially reflecting mirror that is difficult to be cooled from its back face, allowing its cooling only from its lateral side, the temperature of the output mirror 2 is likely to rise in its middle portion, so that a refractive index of the output mirror 2 is likely to become larger in its middle portion. For this reason, the difference in refractive index occurs between the perimeter portion and the middle portion of the output mirror 2, resulting in a so-called thermal lens condition that causes the laser beam to focus.

The difference in refractive index between the middle portion and the perimeter portion of the output mirror 2, that is due to the nonuniform temperature distribution, will be larger proportionally depending on output-mirror degradation condition or beam power of the laser beam (This can be said as a so-called "thermal loading condition.") transmitted through the output mirror, resulting in further focusing the laser beam.

Figure 5A:
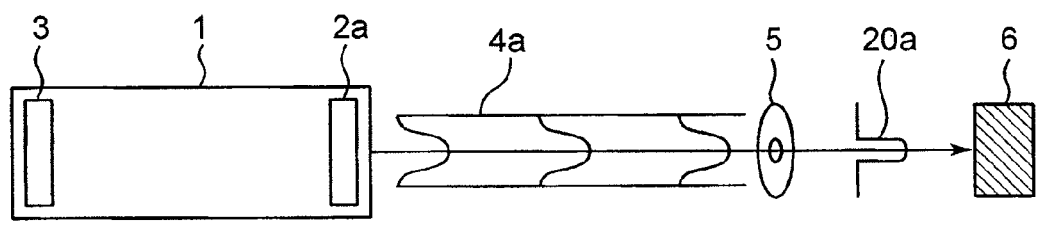
FIG. 5 is a conceptual diagram showing transmitting states of laser beams under lightly degraded condition and severely degraded condition of an output mirror, respectively.
Figure 5B:
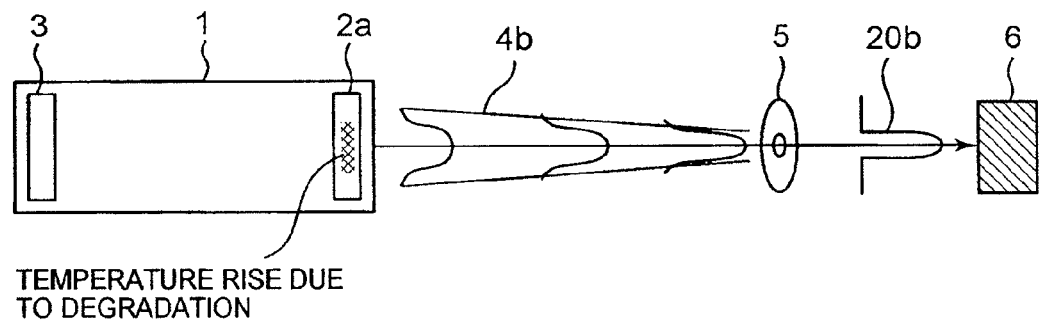

FIG. 5 is a diagram schematically outlining changes in focusing degree of the laser beam 4 under lightly degraded and severely degraded states in the thermal loading condition with respect to a degraded output mirror 2a. FIG. 5(a) shows a case in which the thermal loading condition is light, whereas FIG. 5(b) shows another case in which the thermal loading condition is severe. When the pulse frequency is set at 100 Hz, the thermal loading condition of the output mirror 2a is light, so that a temperature distribution occurs very little in the output mirror 2a, whereby there is a very little focusing effect for the laser beam. For this reason, a laser beam 4a having been transmitted through the output mirror 2a is kept approximately in parallel and is irradiated onto the aperture 5, whereby only a laser beam 20a transmitted through the middle portion of the aperture is irradiated into the beam-power measurement sensor, as shown in FIG. 5(a).

However, when the pulse frequency is set at 1000 Hz, the thermal loading condition of the output mirror 2a is severe, so that a steep gradient temperature distribution occurs in the output mirror 2a, resulting in its thermal lens condition. For this reason, a laser beam 4b transmitted through the output mirror 2a is focused and is irradiated onto the aperture 5 as shown in FIG. 5(b). Therefore, the laser beam 4b is more focused in the middle portion of the aperture 5 to transmit through the aperture 5 in comparison with FIG. 5(a), so that more beam power than the beam power obtained when the pulse frequency is increased from 100 Hz to 1000 Hz, namely more than ten-fold increase thereof is measured by the beam-power measurement sensor 6.

On the other hand, because a temperature distribution occurs very little in a case of a non-degraded output mirror 2 regardless of the high or low of the pulse frequency, the condition of the laser beam becomes similar to FIG. 5(a) even when the pulse frequency is set at either 100 Hz or 1000 Hz. That is to say, in the case of the non-degraded output mirror, a beam-power measurement value at the pulse frequency of 1000 Hz is approximately ten times as large as a beam-power measurement value at the pulse frequency of 100 Hz. For this reason, as shown in FIG. 4 and FIG. 3, the beam power of a laser beam 20 transmitted through the middle portion of the aperture 5 demonstrates little sign of the difference between the degraded output mirror and the non-degraded output mirror when the pulse frequency is set at 100 Hz. However, when the pulse frequency is set at 1000 Hz, the beam power of the laser beam becomes larger with the degraded output mirror than with the non-degraded output mirror.

Note that, when the aperture 5 is absent, whole beam power of the laser beam 4 will be measured by the beam-power measurement sensor 6, and therefore, regardless of whether an occurrence of thermal lensing, there is no substantial difference between the beam-power measurement value with a non-degraded output mirror and that with a degraded output mirror as shown in FIG. 3 and FIG. 4. Namely, although a laser-beam intensity distribution varies due to the occurrence of thermal lensing, it can be said that whole beam power of the laser beam varies very little. Although there is, as a matter of course, slight absorption of the laser beam in the degraded output mirror 2, its amount is very little, so that it is difficult to apply the absorption to determine the output-mirror degradation.

As described above, the present invention relates to the finding that, depending on a output-mirror degradation level, beam power of the laser beam transmitting through the aperture that allows transmission in its middle portion demonstrates significant change when the thermal loading condition in the output mirror is severe, and is provided by utilizing this finding to the output-mirror degradation determination.

Figure 6:
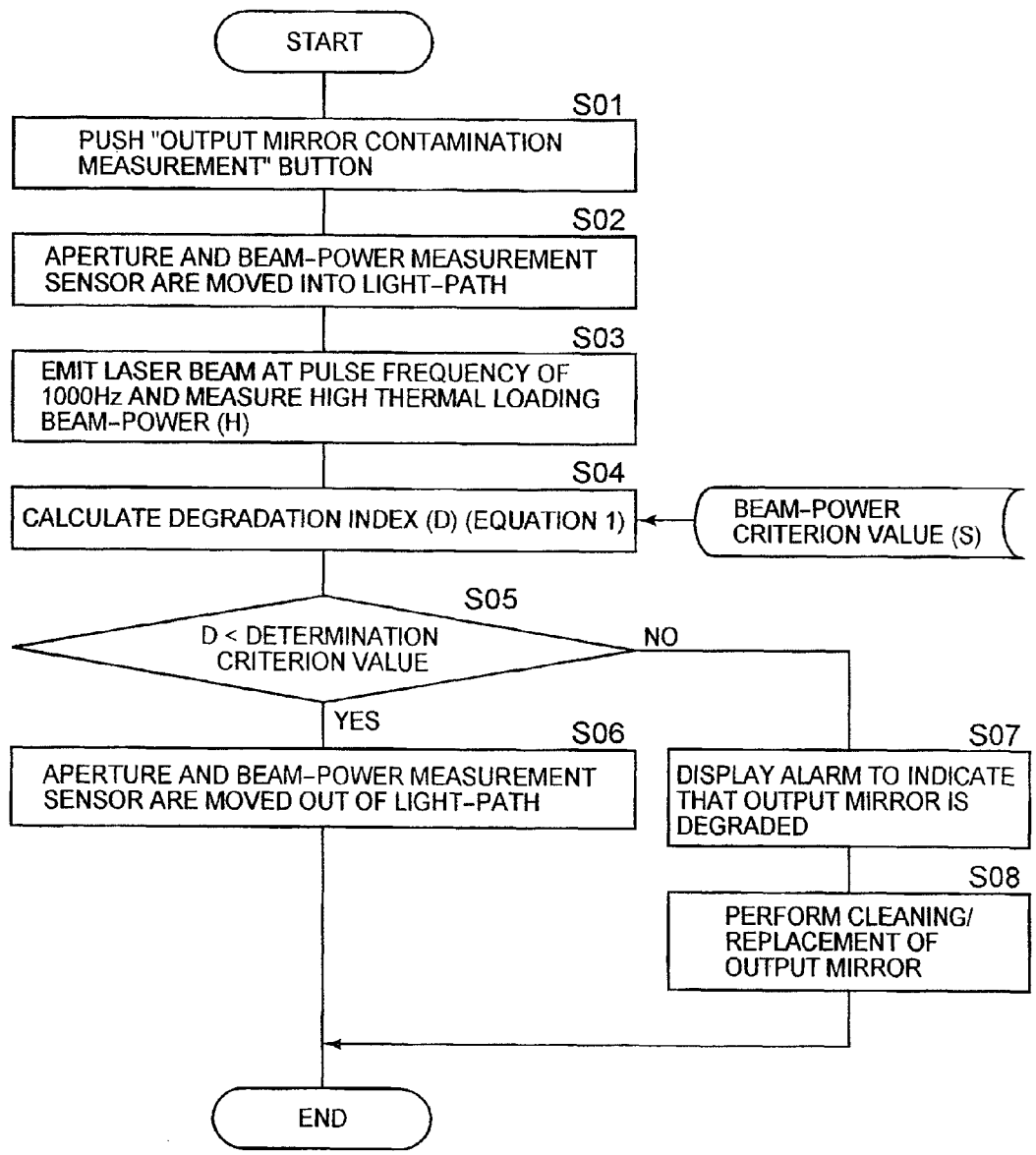
FIG. 6 is a flowchart diagram showing a method of measuring an output-mirror degradation condition in Embodiment 1 of the present invention.
Figure 7:
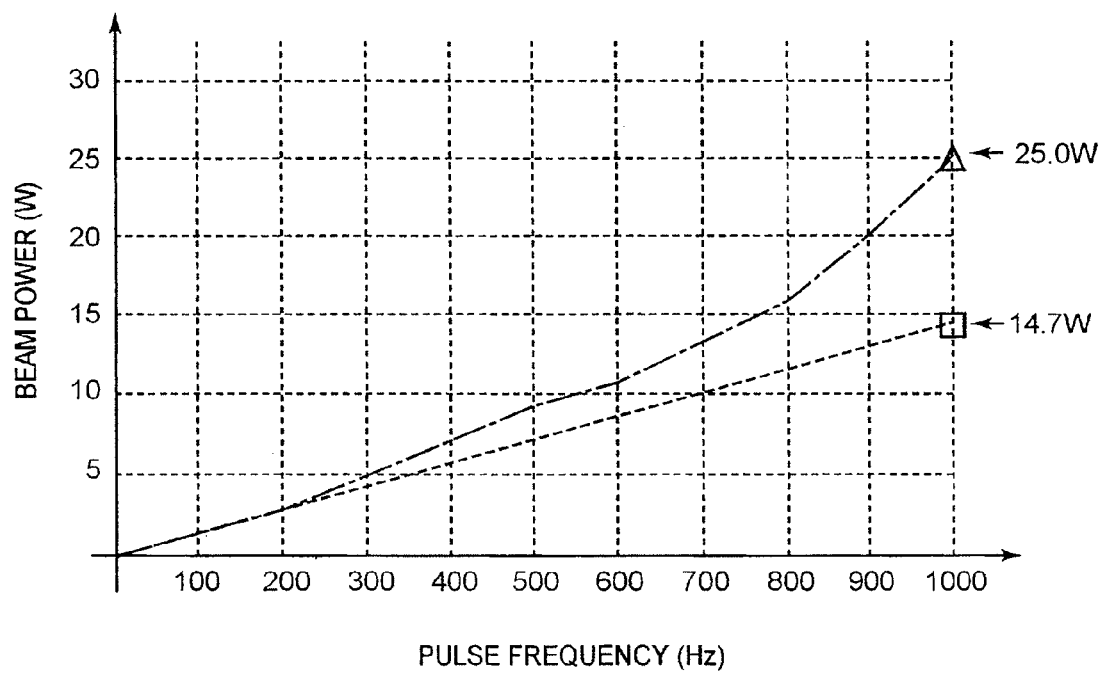
FIG. 7 is a graph showing a measurement result on beam power of a laser beam measured by the method of measuring an output-mirror degradation condition in Embodiment 1 of the present invention.
Figure 8:
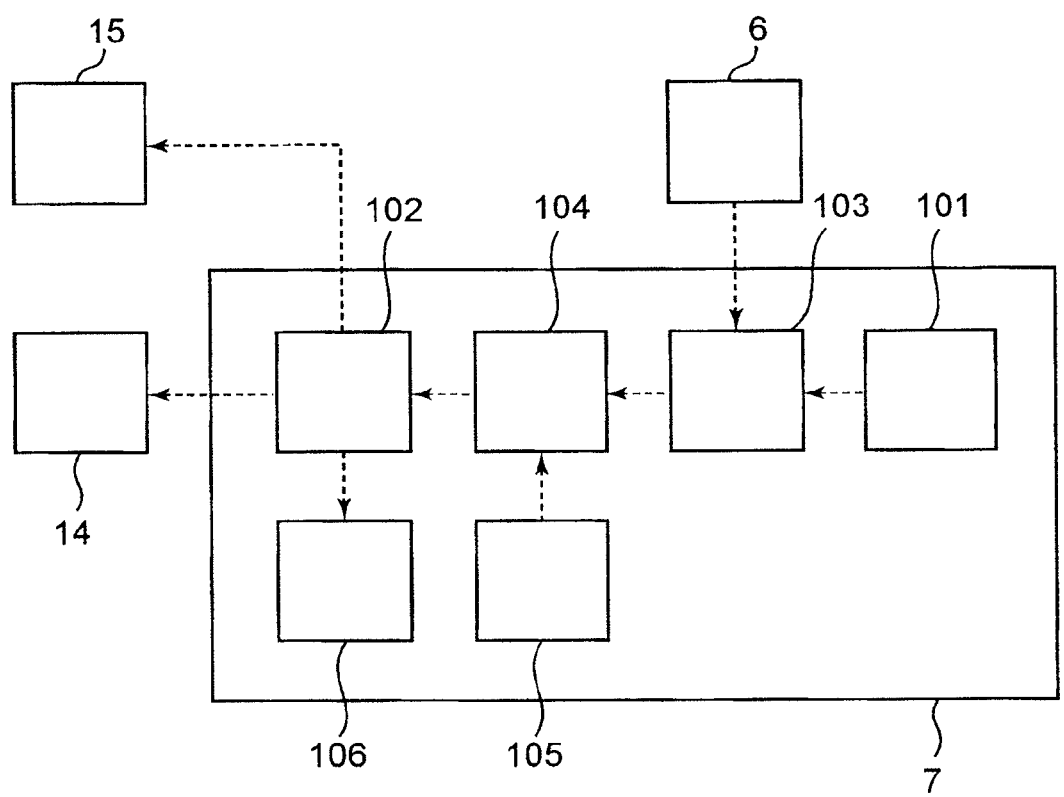
FIG. 8 shows a block diagram of interior of a measurement control device of the laser machining apparatus in Embodiment 1 of the present invention.

Next, specific operations will be explained regarding how output-mirror degradation conditions are measured based on the way described above, in the laser machining apparatus according to Embodiment 1. FIG. 6 is a control flowchart of the measurement control device 7 when measurement of a degradation condition of the output mirror 2 is performed. In addition, FIG. 7 is a diagram showing beam power values of the laser beam in the graph that are measured and/or stored in the control flow. Moreover, FIG. 8 is an internal block diagram for implementing degradation measurement processing by the measurement control device 7. The following measurement values as will be explained below are the values obtained using the output mirror 2 with no degradation that has been used for measuring the data shown in FIG. 3, and the values obtained using the output mirror 2 having 4000 hours of its operation time that has been used for measuring the data shown in FIG. 4. Hereinafter, the explanation will be made referring to FIG. 6, FIG. 7 and FIG. 8.

Before measuring output-mirror degradation condition, beam-power measurement of a laser beam is firstly performed with the output mirror in the initial state, in coincidence with replacement timing of the output mirror or the like. The measurement is performed by emitting a laser beam with high beam power at a pulse frequency of 1000 Hz and with a pulse width of 1 ms. This is because the measurement is performed under the condition in which thermal loading is severe in the output mirror 2 that is not in the degraded condition. The measured beam power of the laser beam is stored in a second memory unit 101 of the measurement control device 7 as a beam-power criterion value (S). Here, the beam-power criterion value (S) that is measured and stored is given as 14.7 W (which is indicated by the point "□" in FIG. 7).

And then, when an output-mirror degradation condition is required to be measured, the operator first pushes an "Output Mirror Contamination Measurement" button (S01) to start the measurement. As a matter of course, the measurement operation may be performed automatically at a time when the laser apparatus starts up, or the measurement operation may be performed by writing measurement instructions into a machining program.

Next, the drive device 15 is operated by a control unit 102 of the measurement control device 7 so that the aperture 5 and the beam-power measurement sensor 6 are moved into a laser-beam light path (S02).

Next, the control unit 102 of the measurement control device 7 instructs the machining control device 14 to emit a laser beam with high beam power at a pulse frequency of 1000 Hz with a pulse width of 1 ms, whereby a desired laser beam is emitted. This is to replicate the condition in which thermal loading is severe in the output mirror 2. And then, beam power of the laser beam is measured by the beam-power measurement sensor 6, so that the measurement data is sent into a processing unit 103 of the measurement control device 7 (S03). The measured beam power of the laser beam is hereinafter referred to as "high thermal loading beam-power (H)." Here, the measured high thermal loading beam-power (H) is given as 25.0 W (which is indicated by the mark "Δ" in FIG. 7).

Next, in the processing unit 103 of the measurement control device 7, an output-mirror degradation condition is determined (S04). While a determinant indicator for the output-mirror degradation condition may be come up with various ways, here used as the determinant indicator is a ratio to what extent beam power of the laser beam is increased with respect to the beam-power criterion value (S). The determinant indicator for the output-mirror degradation condition (hereinafter referred to as a "degradation index (D)") can be determined by the following calculation expression.

$$D(\%) = (H - S) \times 100 \qquad \text{(Equation 1)}$$

The output-mirror degradation index becomes 70.1% in accordance with Equation 1.

A comparison unit 104 of the measurement control device 7 compares the obtained output-mirror degradation index with a determination criterion value separately stored in a first memory unit 105 within the measurement control device 7, so that the output mirror is determined to be in a utilizable degradation condition if the output-mirror degradation index is smaller than the determination criterion value. On the other hand, if the output-mirror degradation index is larger than the determination criterion value, the output mirror is determined to be degraded in the degree it is not utilizable (S05).

When the output mirror 2 is determined to be in the utilizable condition at Step S05, the control unit 102 of the measurement control device 7 makes the drive device 15 operate so that the aperture 5 and the beam-power measurement sensor 6 are moved out of the laser-beam light path (S06). According to this manner, the contamination measurement of the output mirror is completed, and a usual machining work is performed.

On the other hand, when the output mirror 2 is determined at Step S05 to be degraded and not utilizable, the control unit 102 of the measurement control device 7 displays an alarm or the like by an alarm display unit 106 so as to notify the operator that the output mirror 2 is degraded (S07).

In response to the alarm, the operator performs cleaning or replacement of the output mirror 2 (S08). As a matter of course, cleaning or replacement of the output mirror 2 may be performed by such an automatic device for its operation installed into the laser machining apparatus so that automatic cleaning or the like is performed. By completing the cleaning or replacement of the output mirror 2, the output mirror contamination measurement is completed.

Next, the explanation will be made for the procedures to set the determination criterion value used at Step S05.

When degradation occurs in the output mirror 2, a focusing position by the focusing lens 11, a so-called laser-beam focusing point, changes in accordance with the degradation condition. The amounts of focusing position change of the output mirror 2 corresponding to its degradation condition are shown in FIG. 9. The values shown in FIG. 9 are indicative of the differences between focusing positions with the minimum beam power namely at a pulse frequency of 100 Hz and focusing positions with the maximum beam power namely at a pulse frequency of 1000 Hz in the laser machining apparatus according to Embodiment 1. These values may be determined by performing actual machining, or by simulation. FIG. 9 is determined by simulation. In addition, because these values vary depending on optical component placement, an aperture position and a useful range of laser beam power in the laser machining apparatus, it is preferable to calculate them for the each laser machining apparatus. In the case of the laser machining apparatus according to Embodiment 1, referring to FIG. 9, the focusing position changes by about 11 mm at the maximum depending on the thermal loading condition, for the output mirror at 4000 hours of its operation time where the output-mirror degradation index is 70.1%.

Here, FIG. 10 shows focusing tolerances of cases in which cutting machining is performed for various materials by the laser machining apparatus according to Embodiment 1. The focusing tolerance designates an allowable range of a focusing position at which stable cutting can be performed even if the focusing position varies from the material surface. It can be understood that, when the output-mirror degradation index is 70.1% (the amount of focusing position change is about 11 mm), it is not possible to perform a stable cutting machining for any of the materials of stainless steel, iron and aluminum. On the contrary, it can be understood from FIG. 9 that, in order to perform the stable cutting machining for all of the materials of stainless steel, iron and aluminum, the amount of focusing position change should be equal to or less than 3 mm, and therefore the output-mirror degradation index should be equal to or less than 35%. That is, it is adequate that the determination criterion value be set at 35%. Therefore, by acquiring data corresponding to FIG. 9 and FIG. 10 for each laser machining apparatus, a determination criterion value can be determined in accordance with the material of workpiece. Note that, the values shown in FIG. 10 are values for one example of the laser machining apparatus according to Embodiment 1, which may vary depending on a configuration of the laser machining apparatus; therefore, it is preferable to calculate them for each laser machining apparatus.

According to the manner described above, the output-mirror degradation condition has been quantitatively evaluated with an inexpensive and simple configuration by changing the thermal loading condition of the output mirror on pulse frequency basis, and by measuring beam power of the laser beam transmitted through the aperture.

Note that, in Embodiment 1 described above, the aperture 5 and the beam-power measurement sensor 6 are automatically moved into or out of the laser-beam light path by means of the drive device 15; however, as a matter of course, the operator may manually move them into or out of the path as the occasion demands.

In addition, in Embodiment 1 described above, the measurement is performed at 1000 Hz that is the maximum pulse frequency in regard to the pulse width of 1 ms so as to replicate the condition in which thermal loading of the output mirror is severe; however, it is not required to perform at the maximum, but the measurement may adequately be performed with the beam power as high as possible. As a matter of course, it is needless to say from FIG. 4 that, when the measurement is performed with the maximum beam power, the difference in beam power that depends on the degradation level of the output mirror becomes more significant, so that the accuracy of the measurement is enhanced.

Moreover, in Embodiment 1, the output-mirror degradation condition is determined based on the degradation index (D) obtained in accordance with Equation 1; however, it may be determined by using, for example, a simple difference corresponding to what extent the measured high thermal loading beam-power (H) is increased in beam power from the beam-power criterion value (S), and thus the point is to apply the high thermal loading beam-power (H) as a subject matter used for the determination.

Note that, it is important that an optical component causing thermal lensing is not placed between the output mirror 2 and the aperture 5. This is because, if there exists such an optical component causing the thermal lensing therebetween, there is a possibility that the high thermal loading beam-power (H) may change even though the output lens is not degraded, so that degradation determination cannot be performed accurately. Therefore, when the degradation condition of the output mirror 2 is to be determined, it is preferable to place the aperture 5 and the beam-power measurement sensor 6 directly downstream of the laser oscillator 1.

Embodiment 2

By the way, in case of the laser machining apparatus in Embodiment 1, beam power of the laser beam is measured at the pulse frequency of 1000 Hz with respect to the output mirror immediately after the replacement, with the presumption that the mirror condition is a non-degraded condition, whereby the measurement value is stored as the beam-power criterion value (S). This does not particularly arise a problem in usual times; however, when there exists an initial abnormality such as degradation in the output mirror, there is a possibility that the beam-power criterion value (S) becomes inaccurate. Alternatively, it is presumable to arise a problem that the degradation measurement cannot be performed because the measurement of the initial state has not been performed. Hence, in order to resolve those problems described above, a laser machining apparatus in Embodiment 2 is capable of determining a beam-power criterion value (S) at the time when degradation of the output mirror is measured, instead of determining it by the measurement of the output mirror in its initial state. The configuration of the laser machining apparatus is approximately similar to that in FIGS. 1 and 2 of Embodiment 1, provided that the operations of the measurement control device 7 differ therefrom.

The reasons why the beam-power criterion value (S) can be obtained at the time when degradation of the output mirror is measured are as follows.

Attention is given to the point that the pulse frequency and beam power are approximately proportional to each other with a non-degraded output mirror regardless of the presence and absence of the aperture as shown in FIG. 3, and to the point that the beam power is almost the same at the pulse frequency of 100 Hz regardless of the degradation level of the output mirror as shown in FIG. 3 and FIG. 4. Accordingly, by measuring beam power of the laser beam under low thermal loading condition at the pulse frequency of 100 Hz when the degradation is measured, and then by assuming the measurement value as that for a non-degraded output mirror, the beam power at 1000 Hz for the non-degraded output mirror is calculated using a proportionality equation, and the calculated result can thus be defined as the beam-power criterion value (S).

Figure 11:
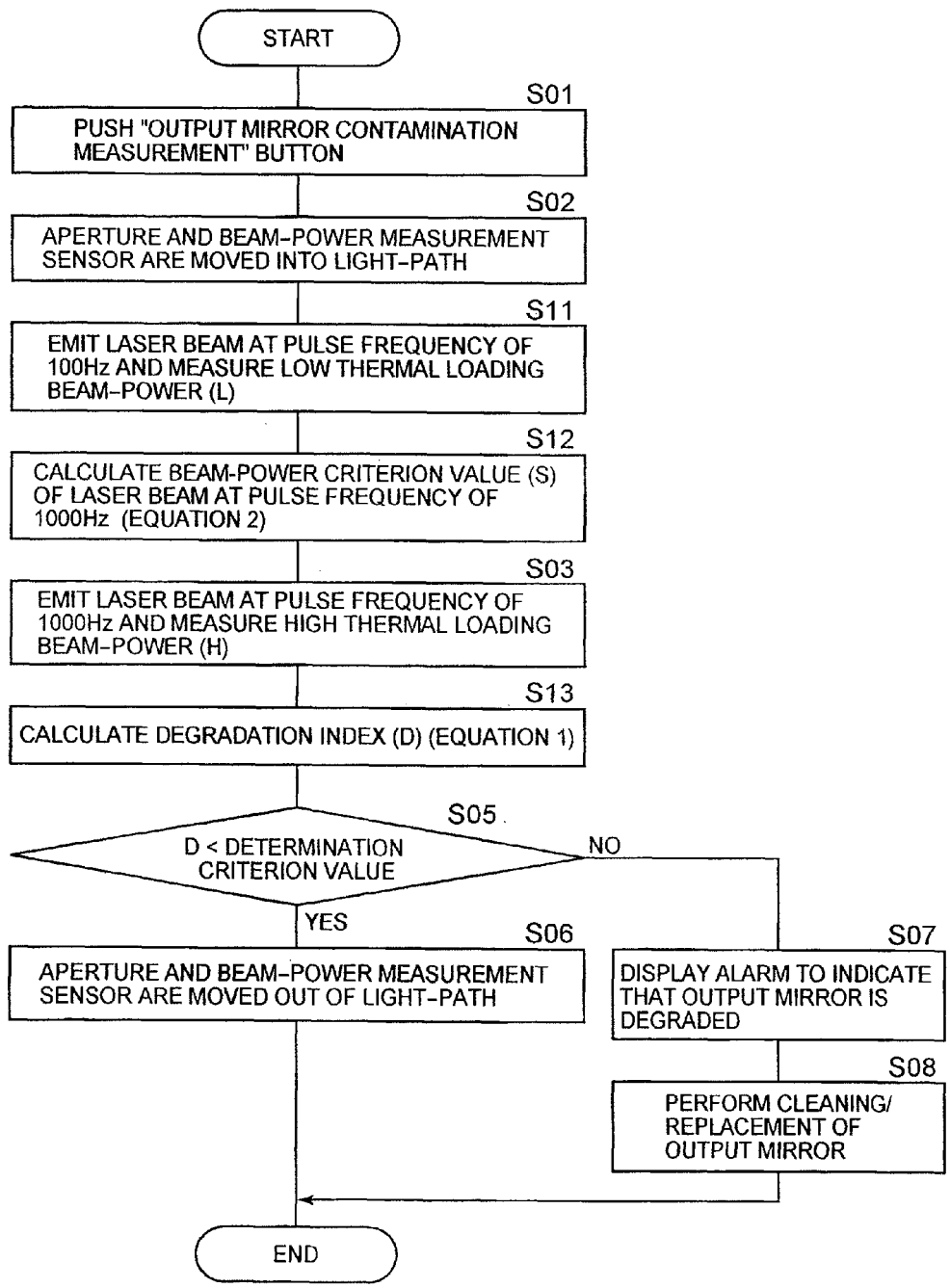
FIG. 11 is a flowchart diagram showing a method of measuring an output-mirror degradation condition in Embodiment 2 of the present invention.
Figure 12:
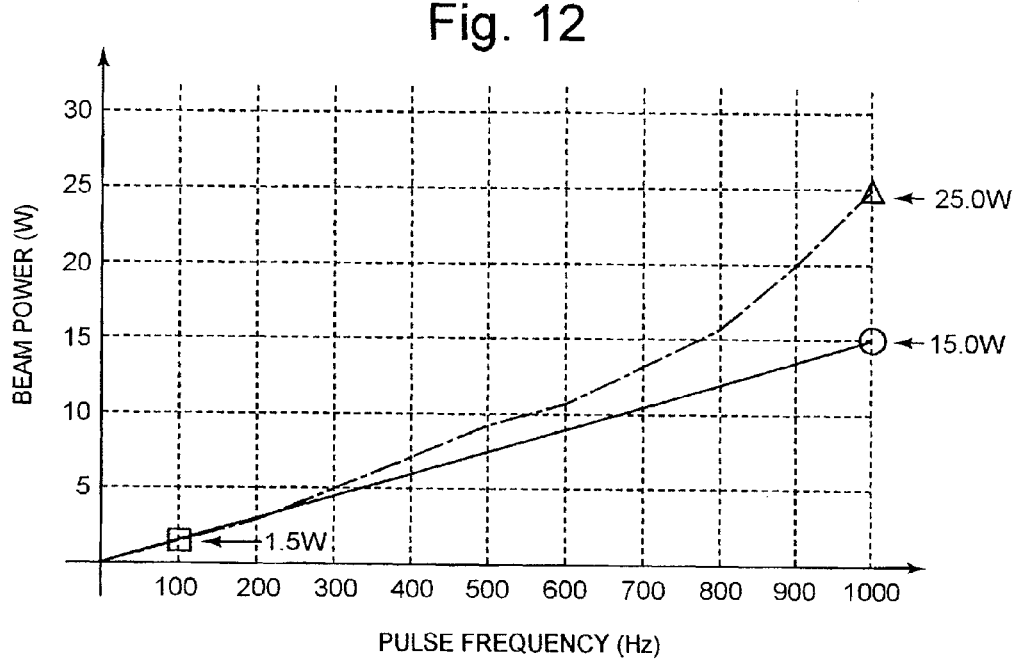
FIG. 12 is a graph showing beam power of a laser beam measured or calculated by the method of measuring an output-mirror degradation condition in Embodiment 1 of the present invention.
Figure 13:
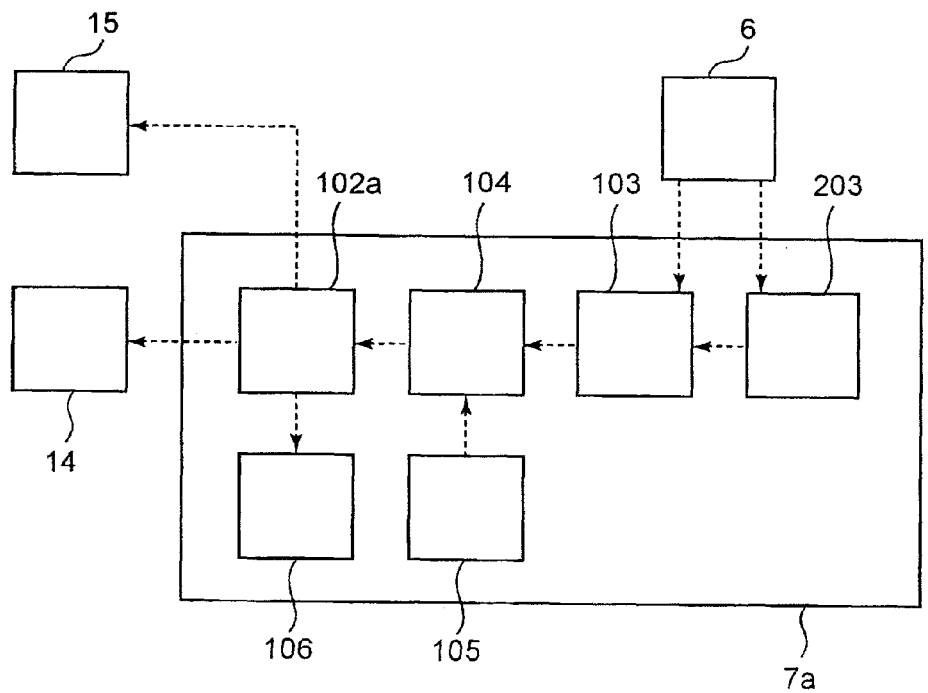
FIG. 13 shows a block diagram of interior of a measurement control device of a laser machining apparatus in Embodiment 2 of the present invention.

Next, the operations of the laser machining apparatus according to Embodiment 2 will be explained based on the reasoning described above. FIG. 11 is a control flowchart of a measurement control device 7a when degradation condition measurement of the output mirror 2 is performed. The same step numbers designate the same controls as those in the flowchart of FIG. 6 in Embodiment 1. In addition, FIG. 12 is a diagram showing beam power values of the laser beam in the graph that are measured or calculated during the control flow. Moreover, FIG. 13 is an internal block diagram of the measurement control device 7a for implementing degradation measurement processing according to Embodiment 2. The following measurement values as will be explained below are the values obtained using the output mirror 2 having 4000 hours of its operation time that has been used for measuring the data shown in FIG. 4. Hereinafter, the explanation will be made referring to FIG. 11, FIG. 12 and FIG. 13.

Firstly, in a similar manner to FIG. 6 in Embodiment 1, Step S01 and Step S02 are executed, so that preparation for the degradation condition measurement is performed.

Next, a control unit 102a of the measurement control device 7a instructs, after completing movement of the aperture 5 and the beam-power measurement sensor 6, the machining control device 14 to emit a laser beam with low beam power at a pulse frequency of 100 Hz with a pulse width of 1 ms, whereby a desired laser beam is emitted. This is because a lightly loaded thermal loading condition is to be replicated in the output mirror 2. And then, beam power of the laser beam is measured by the beam-power measurement sensor 6, so that the measurement data is sent into a criterion-value calculation unit 203 of the measurement control device 7a (S11). The measured beam power of the laser beam is hereinafter referred to as "low thermal loading beam-power (L)." Here, the measured low thermal loading beam-power (L) is given as 1.5 W (which is indicated by the point "□" in FIG. 12).

Next, the criterion-value calculation unit 203 in the measurement control device 7a determines a beam-power criterion value (S) at a pulse frequency of 1000 Hz, based on the measured low thermal loading beam-power (L) (S12). As described above, assuming the measurement value at Step S11 as that for a non-degraded output mirror, the beam power at 1000 Hz is calculated using a proportionality equation. Consequently, the beam-power criterion value (S) can be determined by the following calculation expression.

$$S = L \times 1000 \text{ Hz} \pm 100 \text{ Hz} \qquad \text{(Equation 2)}$$

In accordance with Equation 2, the beam-power criterion value (S) becomes 15.0 W (which is indicated by the mark "○" in FIG. 12, and the straight line in FIG. 12 is the proportional straight line). This value is approximately the same as the beam-power criterion value 14.7 W obtained using the measurement method in Embodiment 1, indicating that the beam power at 1000 Hz for the non-degraded output mirror is accurately calculated by Equation 2.

Next, in a similar manner to FIG. 6 in Embodiment 1, Step S03 is executed. Namely, a laser beam with high beam power is emitted at a pulse frequency of 1000 Hz with a pulse width of 1 ms, whereby the condition in which thermal loading is severe is replicated in the output mirror 2. And then, beam power of the laser beam is measured by the beam-power measurement sensor 6, so that the measurement data is sent into the processing unit 103 of the measurement control device 7a. In a similar manner to FIG. 7 in Embodiment 1, the measured high thermal loading beam-power (H) is given as 25.0 W (which is indicated by the mark "△" in FIG. 12).

Next, in the processing unit 103 of the measurement control device 7a, an output-mirror degradation condition is determined (S13). At Step S04 in FIG. 6 in Embodiment 1, the degradation index (D) is determined using the beam-power criterion value stored in the memory unit; however, in Embodiment 2, the degradation index (D) is determined using the beam-power criterion value (S) calculated at Step S12. As the calculation expression for the degradation index (D), Equation 1 is used similarly to the manner as set forth in the embodiment. From Equation 1, the output-mirror degradation index becomes 66.7%. Thus, approximately the same value as the degradation index 70.1% obtained using the measurement method in Embodiment 1 has been obtained.

And thereafter, as similar to FIG. 6 in Embodiment 1, the degradation measurement ends after Step S05 through Step S06, or the measurement ends after Step S05 through Steps S07 and S08.

With the operations described above, the laser machining apparatus according to Embodiment 2 requires slightly more time for the measurement, in comparison with the laser machining apparatus according to Embodiment 1, because the low thermal loading beam-power (L) is necessary to be measured at the time when the degradation is measured. However, without measuring beam power of the laser beam in the initial state of the output mirror, the beam-power criterion value can be determined at the time when the degradation condition is measured, so that there is an advantage in that the degradation condition measurement can be performed regardless of the degradation level of the output mirror in its initial state. In addition, on the basis of this feature, it is also possible to determine whether or not there is degradation in the output mirror in its initial state.

By the way, the aperture utilized for the degradation measurement in any one of Embodiment 1 and in Embodiment 1, has its opening diameter being set at ϕ2.5 mm that is 50% of the laser beam diameter ϕ5.0 mm for measuring the degradation condition of the output mirror 2. However, because it has been made clear by experiment that there exists an appropriate range for the opening diameter of the aperture 5, the optimization in the opening diameter of the aperture will be explained as follows.

Figure 14:
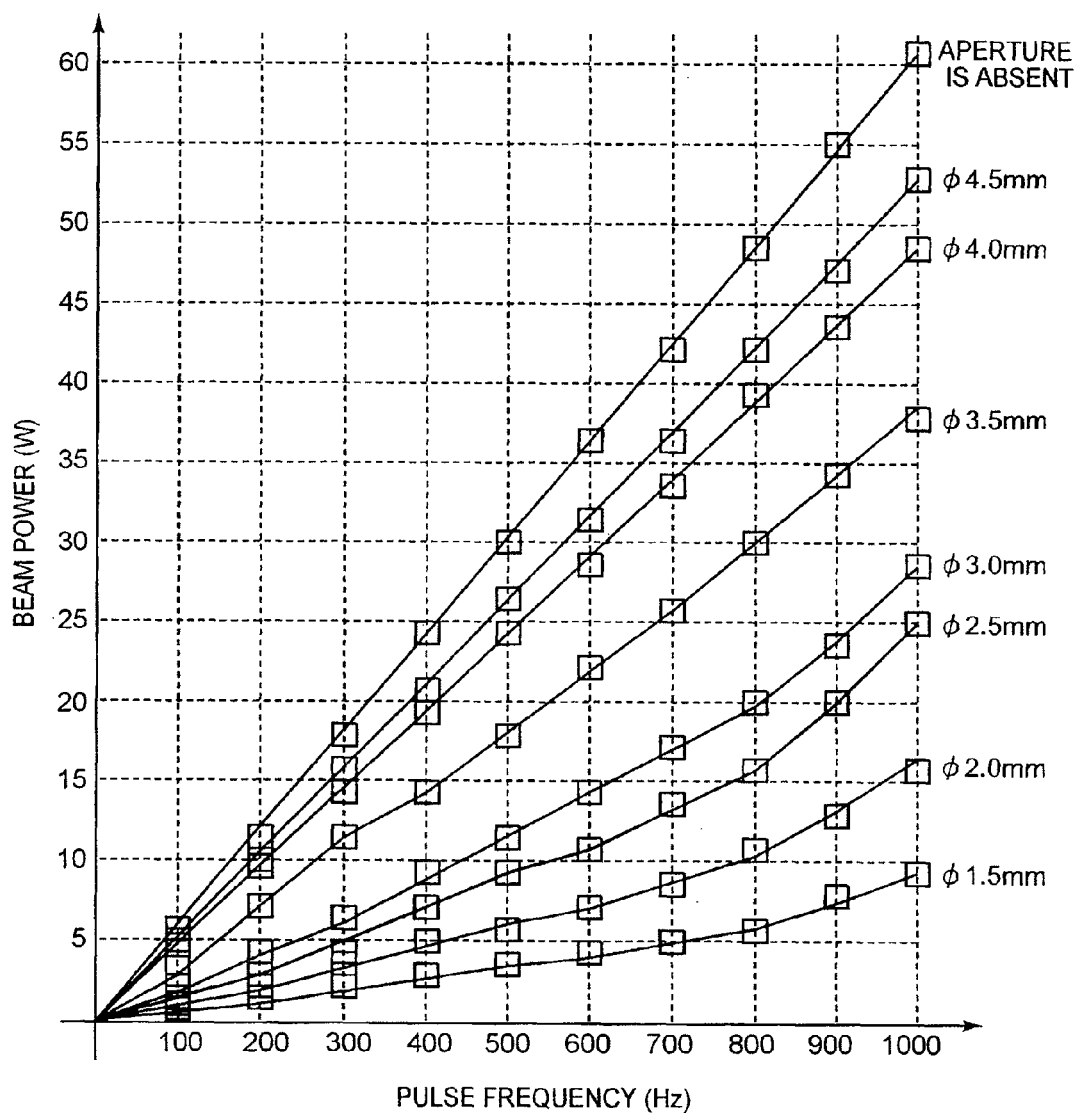
FIG. 14 is a graph showing a measurement result, using an output mirror with its operation time of 4000 hours, on beam power of a laser beam when its pulse frequency is changed, with respect to various opening diameters of an aperture.

FIG. 14 is a graph showing a measurement result on a relationship between pulse frequencies of a laser beam and beam power using the aperture when its opening diameter is changed in increments of ϕ0.5 mm from ϕ1.5 mm to ϕ4.5 mm. Note that, the utilized output mirror is under the same degradation condition of 66.7% as the one in FIG. 4. In addition, FIG. 15 is based on the measurement result in FIG. 14 and describes correspondingly for each aperture: beam power of the laser beam at a pulse frequency of 1000 Hz (namely, high thermal loading beam-power (H)); a beam-power criterion value (S) at a pulse frequency of 1000 Hz determined by Equation 2 from beam power of the laser beam at a pulse frequency of 100 Hz (namely, low thermal loading beam-power (L)); and an output mirror degradation index (D) determined by Equation 1 using the high thermal loading beam-power (F) and the beam-power criterion value (S). Referring to FIG. 14, such tendency can be observed that, when an opening diameter of the aperture is large, the pulse frequency and the beam power are in a proportional relationship, and that the smaller the opening diameter is, the larger the displacement from the proportional relationship becomes. In addition, referring to FIG. 15, such tendency can be observed that the larger an opening diameter of the aperture, the more the measurement result of degradation indexes are neared to 0.0%, and that the smaller the opening diameter of the aperture, the more the degradation indexes are neared to 70.0%.

This is due to the following reasons.

Figure 16A:
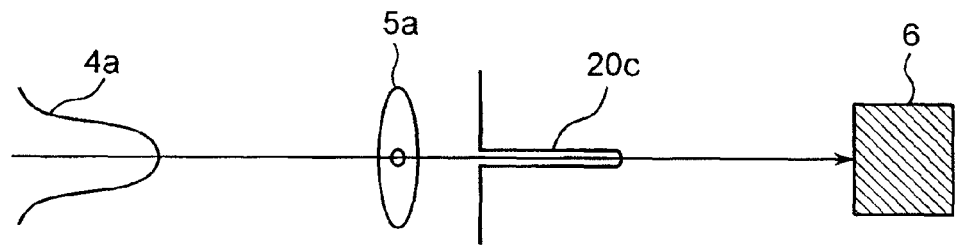
FIG. 16 is a conceptual diagram outlining intensity distribution of a laser beam before and after it is transmitted through an aperture when an opening diameter of the aperture is sufficiently small with respect to a laser beam diameter.
Figure 16B:
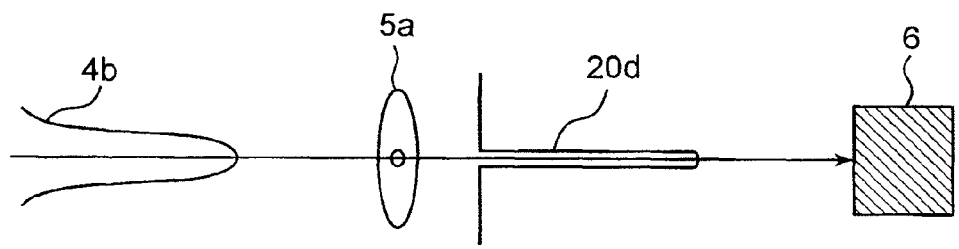

FIG. 16 is a diagram outlining intensity distribution of a laser beam before and after it is transmitted through an aperture 5a when the opening diameter of the aperture 5a is sufficiently small with respect to the laser beam diameter. FIG. 16(a) is a diagram when a thermal loading condition is light with respect to a degraded output mirror, and FIG. 16(b) is a diagram when the thermal loading condition is severe thereto so that the laser beam 4b is focused by a thermal lens effect. When the opening diameter of the aperture 5a is sufficiently smaller than the laser beam diameter, only the middle portion of the laser beam 4 is transmitted through the aperture as shown in FIG. 16, so that the change in the laser beam diameter caused by a thermal loading condition is likely to influence the beam-power measurement result. Namely, this is because, the intensity distribution of the laser beam 4 is more strengthened in its middle portion in the case of severely loaded thermal loading condition as shown in FIG. 16(b) than the case of lightly loaded thermal loading condition as shown in FIG. 16(a), whereby the ratio of the laser beam 20 transmitting through the aperture 5a increases.

Figure 17A:
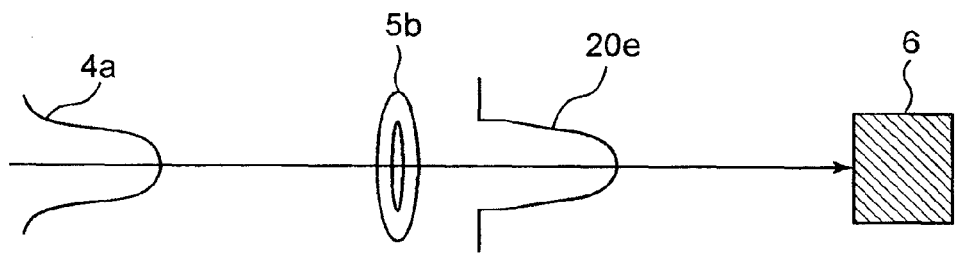
FIG. 17 is a conceptual diagram outlining intensity distribution of a laser beam before and after it is transmitted through an aperture when an opening diameter of the aperture is approximately equivalent to the laser beam diameter.
Figure 17B:
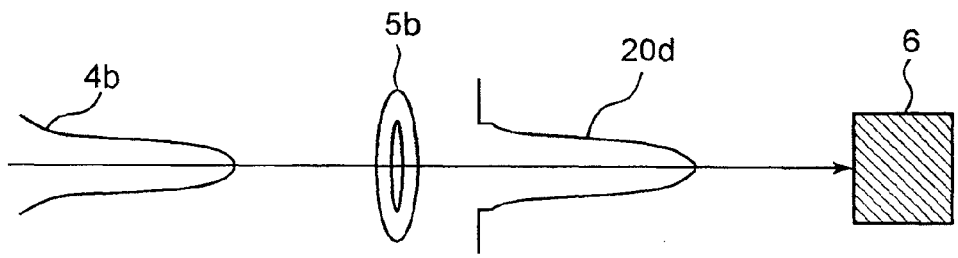

Meanwhile, FIG. 17 is a diagram outlining intensity distribution of a laser beam before and after it is transmitted through an aperture 5b when the opening diameter of the aperture 5b is approximately equivalent to the laser beam diameter. Similarly to FIG. 16, FIG. 17(a) is a diagram when a thermal loading condition is light, and FIG. 17(b) is a diagram when the thermal loading condition is severe so that the laser beam 4b is focused by a thermal lens effect. When the diameter of the aperture 5b is not sufficiently smaller than the laser beam diameter, namely when the opening diameter of the aperture 5b and the laser beam diameter become comparable to each other as shown in FIG. 17(a), a large portion of the laser beam 4a is transmitted through the aperture 5b at the time of measurement with the pulse frequency of 100 Hz providing a lightly loaded thermal loading condition. For this reason, even if the diameter of the laser beam 4b is smaller at the pulse frequency of 1000 Hz providing a severely loaded thermal loading condition as shown in FIG. 17(b), a large portion of the laser beam 4b is transmitted through the aperture 5b even when a laser-beam intensity distribution changes, so that the change is not likely to influence the beam-power measurement result. This is because the condition here is said to be approximately the same as the aforementioned condition where the aperture is absent.

In order to accurately determine the output-mirror degradation condition, it is suitable that the change in the laser beam diameter largely influences on the beam-power measurement result. From the result in FIG. 15, such tendency can be observed that, when the aperture diameter is equal to or less than 60% (equal to or less than φ3.0 mm) of the laser beam diameter, the output-mirror degradation index is saturated at about 70%; therefore, it is preferable to make the aperture diameter equal to or less than 60% of the laser beam diameter. However, if the opening diameter of the aperture is made much too small, a beam-power measurement value may become too small, whereby a measurement error becomes relatively larger, so that it is preferable to select an appropriate opening diameter taking into consideration the accuracy of the beam-power measurement sensor.

According to the present invention, because the initial state measurement of the output mirror is not required for the output-mirror degradation condition determination, it also becomes possible to determine, for example, whether or not there is degradation in the output mirror in its initial state. In addition, the degradation condition can be determined more accurately by optimizing the opening diameter of the aperture utilized for the measurement.

Note that, in Embodiment 2 described above, the measurement is performed at the maximum pulse frequency of 1000 Hz so as to replicate a severely loaded thermal loading condition of the output mirror; however, similarly to Embodiment 1, it is not required to perform at the maximum, but the measurement may adequately be performed with the beam power as high as possible. As a matter of course, it is preferable to perform the measurement with the maximum beam power from a viewpoint of enhancing the accuracy of the measurement. In addition, the measurement is performed at 100 Hz that is the minimum pulse frequency so as to replicate a lightly loaded thermal loading condition of the output mirror; however, it is not required to perform at the minimum, but the measurement may adequately be performed with the beam power as low as possible. As a matter of course, it is clear from FIG. 3 and FIG. 4 that, when the measurement is performed with the minimum beam power, values closer to the beam power of the laser beam with a non-degraded output mirror can be obtained, so that a more accurate beam-power criterion value (S) can be obtained.

In addition, in Embodiment 2 or in the preceding Embodiment 1, the aperture 5 is only used for the degradation determination measurement of the output mirror 2. Meanwhile, like a laser machining apparatus for machining printed wiring boards, there is also a laser machining apparatus that already includes an aperture in its optical axis for machining. In such a machining apparatus, if an opening diameter of the aperture for machining is within the appropriate range described above, namely it is equal to or less than 60% of the laser beam diameter, and if the aperture position is appropriate, namely there is no optical component causing thermal lensing between the laser oscillator and the aperture, this aperture may be used for the degradation determination measurement of the output mirror 2. In this case, a configuration may be adopted in such a manner that, while the aperture is remained fixed, only a beam-power measurement sensor that measures beam power of a laser beam transmitted through the aperture is moved onto or out of the optical axis of the laser beam. In such a configuration, it is not necessary to separately provide the aperture, so that the output-mirror degradation condition can be measured with a more inexpensive and simpler configuration.

Embodiment 3

In Embodiment 1 and in Embodiment 2 described above, the thermal loading condition of the output mirror is changed by the pulse frequency of the laser beam. This is because there are many cases that a laser machining apparatus for machining, for example, printed wiring boards or the like, performs machining by controlling the pulse frequency of the laser beam. However, the output-mirror degradation condition measurement of the present invention is made enable if a thermal loading condition of the output mirror can be changed, so that similar effects can be obtained if the thermal loading condition can be changed by anything other than the change in the pulse frequency.

For example, the beam power may be measured with the pulse frequency fixed at 100 Hz by changing the pulse width from 1 ms to 10 ms. If the pulse peak power is the same as in the case of measurement in FIG. 12 for example, exactly the same value placed at the mark "□" in FIG. 12 is obtained when the pulse frequency is 100 Hz and the pulse width is 1 ms; in addition, when the pulse frequency is 100 Hz and the pulse width is 10 ms, resulting in continuous oscillation, the same value placed at the mark "Δ" in FIG. 12 is obtained.

Moreover, in another configuration, the pulse peak power may be changed provided that the pulse frequency and the pulse width are fixed. For example, with the pulse frequency being set at 100 Hz with its pulse width 1 ms, the same value as the one placed at the mark "Δ" in FIG. 12 is obtained when beam power of the laser beam is measured with its pulse peak power that is ten times as large as the pulse peak power with which the mark "□" in FIG. 12 is measured.

As described above, in order to change the thermal loading condition of the output mirror, it is suitable to change the pulse frequency, the pulse width or the pulse peak power, thereby achieving similar effects to those in Embodiment 1 and Embodiment 2. Whether any one of the parameters such as a pulse frequency is to be changed is appropriately and selectively determined in accordance with specifications of the laser oscillator that is included in the laser machining apparatus. As a matter of course, a plurality of parameters among those parameters may be changed in combination. In order to send instructions to the machining control device 14 so as to change the selected parameter(s), it is suitable that the control unit 102 of the measurement control device 7a be appropriately modified.

Note that, in Embodiment 1 and Embodiment 2 described above, the explanation is made for the laser oscillator of pulse oscillation as an example; however, when a laser oscillator of continuous oscillation instead of the pulse oscillation is utilized, similar effects can be obtained by changing only the beam power of the laser beam. Namely, by oscillating the laser beam with low beam power, it is possible to set the output mirror in a condition under low thermal loading, and by oscillating the laser beam with high beam power, it is possible to set the output mirror in a condition under high thermal loading, so that the values placed at the mark "□" and at the mark "Δ" in FIG. 12 can be measured. Accordingly, the output-mirror degradation condition can be determined similarly to the manners as set forth in Embodiment 2. As a matter of course, when beam power of the laser beam in the condition under high thermal loading is measured in the initial state of the output mirror, the determination can also be performed similarly to Embodiment 1.

Embodiment 4

In the laser machining apparatus in Embodiment 1 and Embodiment 2, the aperture 5 and the beam-power measurement sensor 6 are moved into or out of the laser-beam light path as the occasion demands. Hence, time for moving and removing the aperture 5 or the like, and little time for its position adjustment or the like are required. In a laser machining apparatus according to Embodiment 4, degradation condition measurement of an output mirror can be performed without requiring the moving and removing work for the aperture 5 or the like.

Figure 18:
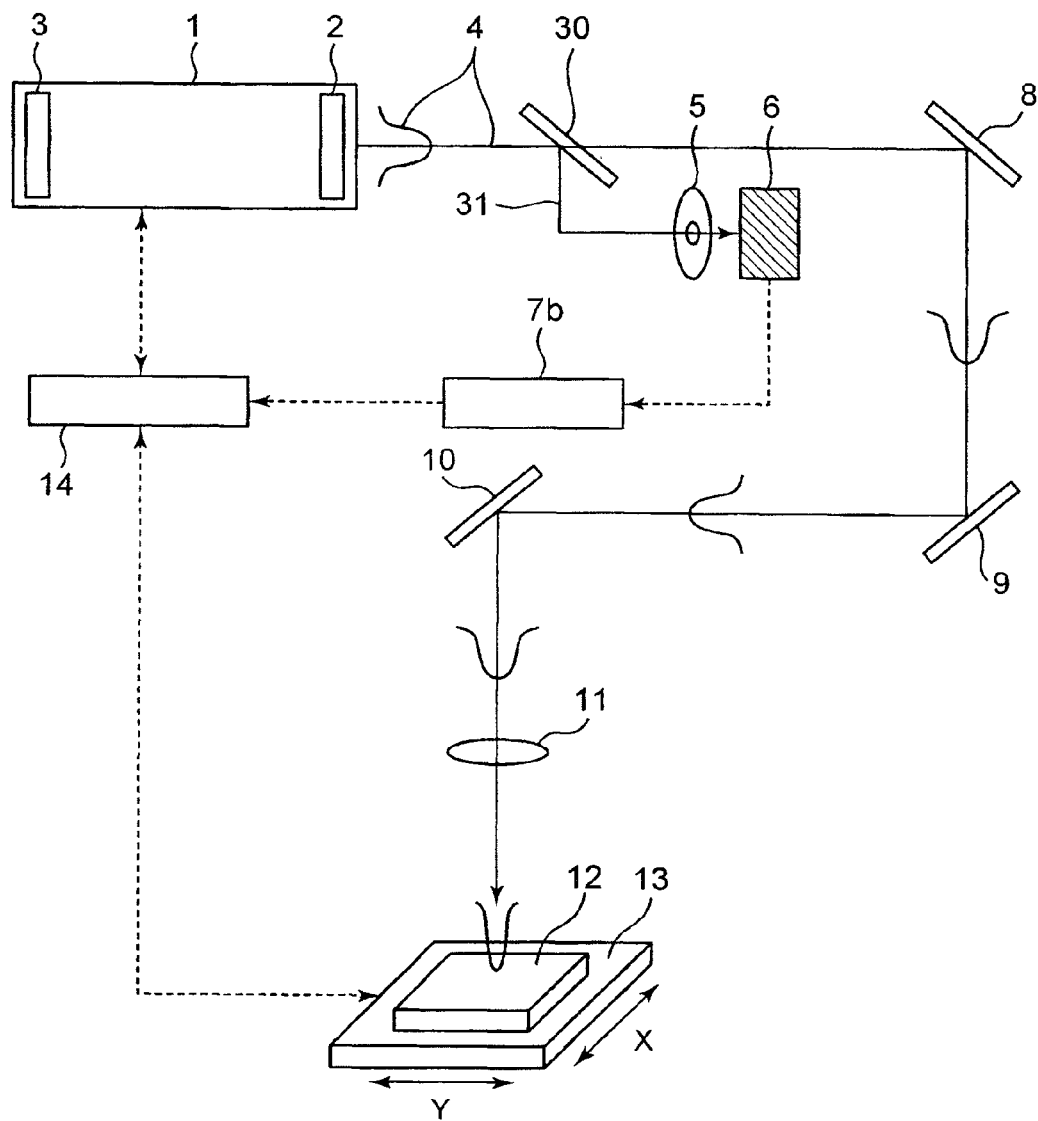
FIG. 18 is a diagram illustrating a configuration of a laser machining apparatus in Embodiment 4 of the present invention.

FIG. 18 illustrates the laser machining apparatus capable of measuring degradation of the output mirror in Embodiment 4 for carrying out the present invention. The same reference numerals and symbols designate the same items as those illustrated in FIG. 1 and FIG. 2. As illustrated in FIG. 18, a partially reflecting-type mirror 30 is placed in a light path of the laser beam 4 emitted from the laser oscillator 1. And then, by placing the aperture 5 and the beam-power measurement sensor 6 in a light path of a partially reflected laser beam 31, beam-power measurement of the laser beam passed through the aperture 5 becomes enabled, to thereby make it possible to measure degradation of the output mirror in a similar manner and a similar processing to that in Embodiment 1 or Embodiment 2.

According to the laser machining apparatus in Embodiment 4, it becomes possible to eliminate the movement of the beam-power measurement sensor 6 and the aperture 5 that is depending on whether the degradation condition is to be measured or not, and therefore the beam power can be measured in real time even though beam power of the laser beam arriving at the workpiece 12 is reduced in comparison with Embodiment 1 and Embodiment 2, so that it is no more required to measure the degradation level taking time and effort in a measurement operation mode, resulting in time saving. For example, if machining is performed with a low beam power and also performed with a high beam power under actual machining, it is possible to measure the output-mirror degradation condition by measuring beam power of the respective laser beams.

Embodiment 5

In the laser machining apparatus according to Embodiment 1 and Embodiment 2, it is so configured that the operator is notified by an alarm or the like when the output mirror is determined to be degraded, so as to perform replacement or cleaning of the output mirror. A laser machining apparatus according to Embodiment 5 can preliminarily notify the operator that timing for replacement or the like is approaching, before the output mirror is degraded so that its replacement or the like is required. The configuration of the laser machining apparatus according to Embodiment 5 is approximately similar to that in FIG. 1 and FIG. 2 of Embodiment 1, provided that the operations of a measurement control device 7b differ therefrom.

Figure 19:
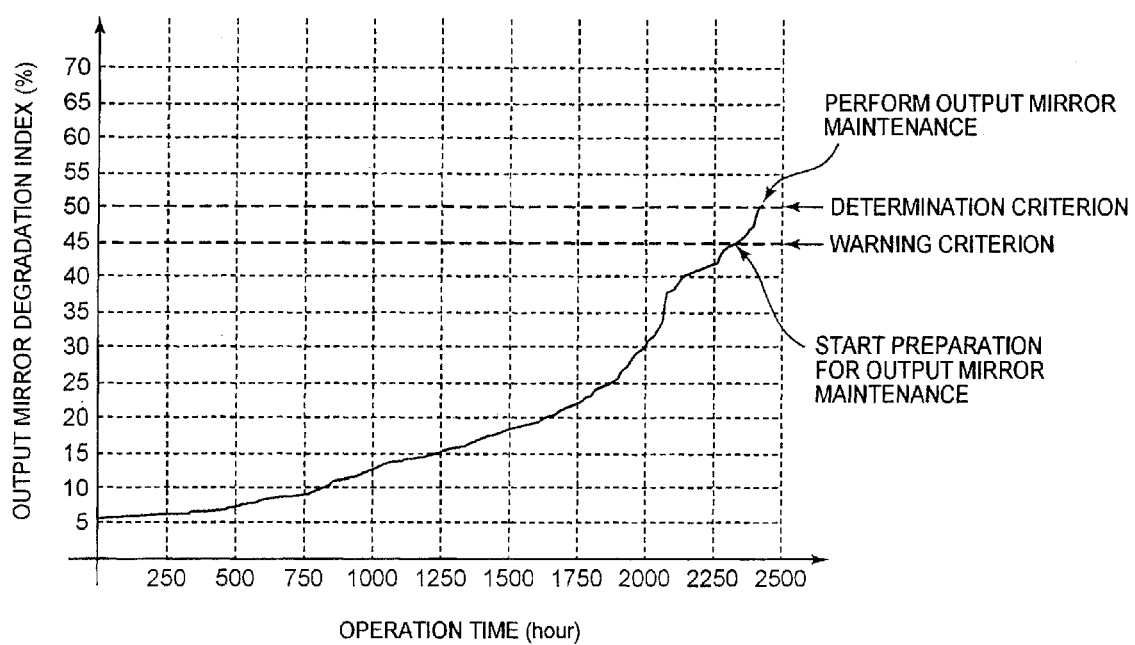
FIG. 19 is a diagram showing a measurement result of an output-mirror degradation condition in Embodiment 5.

FIG. 19 shows a measurement result with respect to an output-mirror degradation condition when only cutting machining has been continued for stainless steel. The output-mirror degradation condition measurement has been performed once a day on a regular basis before starting the cutting machining, using the degradation measurement method according to Embodiment 2. In addition, the focusing tolerance in the cutting machining for stainless steel is 6 mm as referred to in FIG. 10, and an output-mirror degradation condition at which the amount of focusing position change becomes 6 mm is at the degradation index 50% as referred to in FIG. 9; therefore, a determination criterion for an output-mirror degradation index is set at the degradation index 50%. Here, in order to perform preparation for output mirror maintenance before the degree reaching the determination-criterion degradation index 50%, the degradation index 45% being slightly lowered, as a degradation determination standard, than the determination criterion, is set as a warning criterion, as shown in FIG. 19, whereby a message is preliminarily produced.

Figure 20:
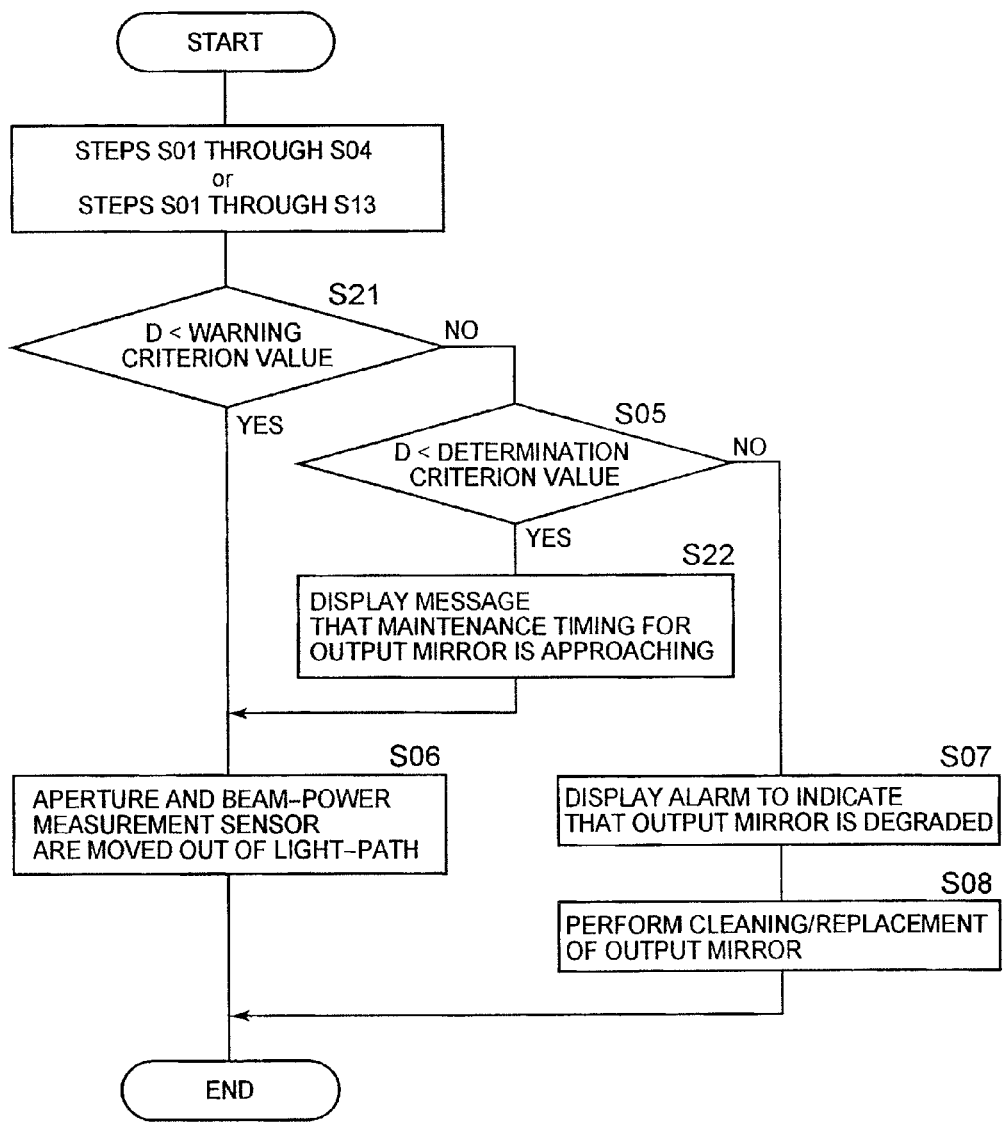
FIG. 20 shows a flowchart diagram of controlling measurement of degradation condition of the output mirror in Embodiment 5.
Figure 21:
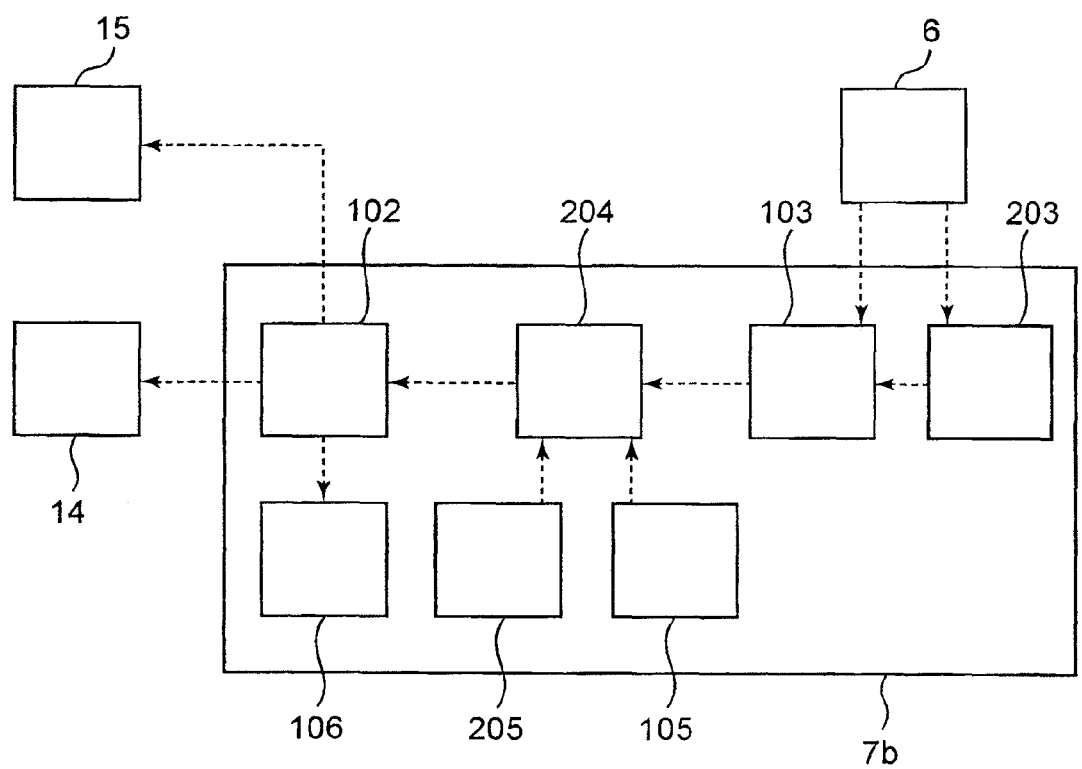
FIG. 21 shows a block diagram of interior of a measurement control device of a laser machining apparatus in Embodiment 5 of the present invention.

Next, the operations of the laser machining apparatus according to Embodiment 5 will be specifically explained. FIG. 20 is a control flowchart of the measurement control device 7b when the degradation condition measurement of the output mirror 2 is performed. The same step numbers designate the same controls in the flowchart of FIG. 6 in Embodiment 1 or in the flowchart of FIG. 11 in Embodiment 2. In addition, FIG. 21 is an internal block diagram of the measurement control device 7b for implementing degradation measurement processing according to Embodiment 5. Hereinafter, the explanation will be made referring to FIGS. 19, 20 and 21.

Firstly, Step S01 through Step S13 are executed in a similar manner to FIG. 6 in Embodiment 1, or Step S01 through Step S04 are executed in a similar manner to FIG. 11 in Embodiment 2, so that the output-mirror degradation index is determined.

After having obtained the degradation index, a comparison unit 204 of the measurement control device 7b compares the obtained output-mirror degradation index with a warning criterion value (45% in FIG. 19) separately stored in a third memory unit 205 within the measurement control device 7b, to thereby determine that maintenance timing for the output mirror is approaching when the output-mirror degradation index is larger than the warning criterion value. On the other hand, when the output-mirror degradation index is smaller than the warning criterion value, it is determined that maintenance timing for the output mirror is still further away.

At Step S21, when determined that the maintenance timing for the output mirror 2 is still further away, the control unit 102 of the measurement control device 7b makes the drive device 15 operate so that the aperture 5 and the beam-power measurement sensor 6 are moved from within the laser-beam light path to the outside of the light path (S06). Accordingly, the output mirror contamination measurement is completed, so that usual machining work is performed.

On the other hand, when degradation of the output mirror 2 proceeds so that it is determined at Step S21 that the maintenance timing is approaching, the comparison unit 204 of the measurement control device 7b then compares the obtained output-mirror degradation index with the determination criterion value (50% in FIG. 19) separately stored in the first memory unit 105 within the measurement control device 7b (S05).

At Step S05, when the output-mirror degradation index is smaller than the determination criterion value, it is not necessary to replace the output mirror, so that, in order to notify the operator that maintenance timing for the output mirror is approaching, the control unit 102 of the measurement control device 7b displays a caution message by the alarm display unit 106 (S22). And then, the measurement ends after executing Step S06. On the other hand, if the output-mirror degradation index is larger than the determination criterion value, it is determined that replacement of the output mirror is required, so that Steps S07 and S08 are executed and thereafter the measurement ends.

With the operations in the laser machining apparatus according to Embodiment 5 as described above, what is worked by the operator in the course of the output-mirror condition under degradation in FIG. 19, for example, is as follows. When the output-mirror degradation condition reached at the degradation index 45% at 2300 hours of the operation time, and the message that maintenance timing for the output mirror was approaching was outputted, the operator prepared to secure a new output mirror and a maintenance worker. When the output-mirror degradation condition reached at the degradation index 50% at 2400 hours of the operation time, meaning that maintenance timing for the output mirror had arrived, the operator performed the maintenance.

According to the manner described above in the laser machining apparatus in Embodiment 5, because a warning criterion, as a degradation determination standard, being slightly lowered than the output-mirror degradation index, is set in the output-mirror degradation condition measurement separately from the output-mirror degradation index, it is possible to preliminarily perform preparation for output mirror maintenance. Accordingly, it becomes possible to reduce a time loss in the output mirror maintenance. Moreover, by regularly measuring the output-mirror degradation condition, it becomes possible to prevent a reduction in machining quality before it otherwise happens in the cutting machining.

Embodiment 6

In the laser machining apparatus according to Embodiment 1 and Embodiment 2, the explanation has been focused to the degradation condition measurement of the output mirror within the laser oscillator; however, the output-mirror degradation measurement method according to the present invention can be adapted to measure degradation condition of an optical component that transmits a laser beam in an optical system outside of the laser oscillator.

Figure 22:
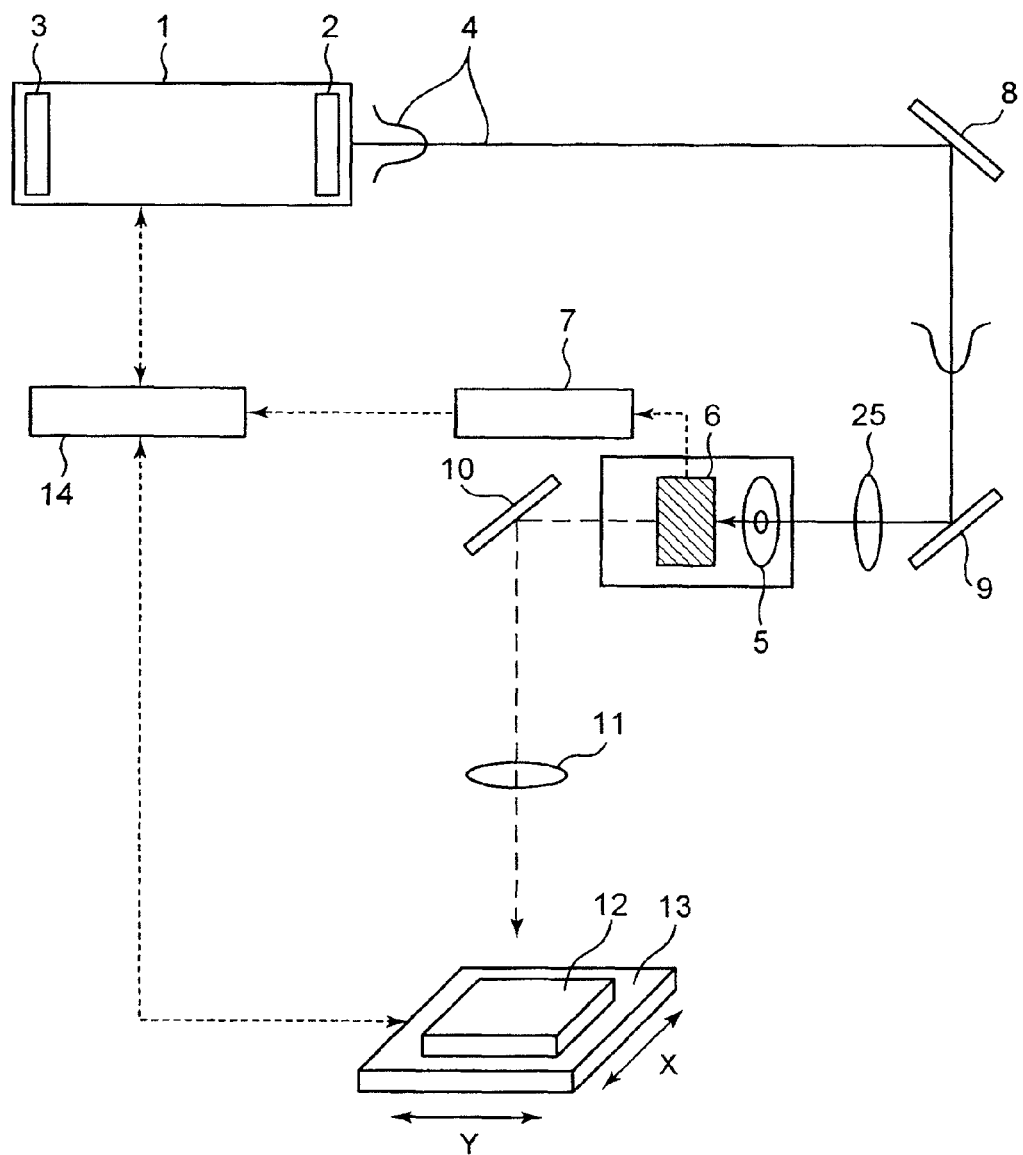
FIG. 22 is a diagram illustrating a configuration of a laser machining apparatus in Embodiment 6 of the present invention.

FIG. 22 illustrates a laser machining apparatus in Embodiment 6 for carrying out the present invention. As illustrated in FIG. 22, an optical component 25 such as a lens that transmits a laser beam is provided in a light path of the laser beam 4 emitted from the laser oscillator 1. In order to measure the degradation condition of the optical component 25, placed immediately downstream of the optical component 25 are the aperture 5 that transmits only a middle portion of the laser beam having been transmitted through the optical component, and the beam-power measurement sensor 6 for measuring beam power of the laser beam having been transmitted through the aperture 5. What is similar to the manner in Embodiment 1 or Embodiment 2 is that the aperture 5 and the beam-power measurement sensor 6 are moved out of the laser-beam light path except when the degradation measurement of the optical component is under way.

With the configuration taken as shown in FIG. 22, the degradation condition of the optical component 25 can be quantitatively determined by measuring beam power of the laser beam transmitted through the aperture 5, followed by processing to calculate the degradation index, as similar to FIG. 6 in Embodiment 1 or to FIG. 11 in Embodiment 2.

However, it is required that, in the laser-beam light path, no degraded optical component be placed on a side of the laser oscillator from the optical component 25 that is a measuring object. This is because, when the output mirror 2 is degraded for example, a laser-beam intensity distribution is changed in the beam power because of the output mirror 2, so that it becomes not possible to distinguish whether the optical component 25 that is the measuring object is degraded or not. Consequently, in the first place, it is necessary to confirm the degradation condition of optical components that transmit the laser beam, in sequence from the side nearer to the laser oscillator 1.

INDUSTRIAL APPLICABILITY

The method of determining degradation of an output mirror in a laser oscillator, and the laser machining apparatus according to the present invention can inexpensively and simply measure an output-mirror degradation condition. In particular, it is easy to apply in a laser machining apparatus that includes an aperture for machining, for example, in the laser machining apparatus for printed wiring boards.

What is claimed is:

1. A laser machining apparatus, comprising:
   a laser oscillator for emitting a laser beam;
   an aperture, placed in a light path of the laser beam emitted from the laser oscillator, for blocking a perimeter portion of the laser beam and for transmitting a middle portion thereof;
   a beam-power measurement means for measuring beam power of a laser beam transmitted through the aperture; and
   a control means for determining a degradation condition of an output mirror in the laser oscillator, based on the beam power value measured by the beam-power measurement means when the laser beam is emitted with predetermined beam power,
   wherein the predetermined beam power is a beam power with a level at which a thermal lens effect occurs when the output mirror is degraded, and
   wherein the control means determines the degradation condition output at the predetermined beam power based on comparing the beam power measured by the beam-power measurement means with a criterion value.

2. The laser machining apparatus as set forth in claim 1, wherein the predetermined beam power is high beam power.

3. The laser machining apparatus as set forth in claim 2, wherein:
   the control means comprises a memory unit for storing, as the criterion value, a beam power value of the laser beam emitted with the high beam power separately measured by the beam-power measurement means using a non-degraded output mirror, and
   the control means determines the degradation condition of the output mirror in the laser oscillator by comparing the criterion value stored in the memory unit with the beam power value measured by the beam power measurement means when the laser beam is emitted with the predetermined beam power.

4. The laser machining apparatus as set forth in claim 2, wherein the predetermined beam power further includes low beam power with a level at which a thermal lens effect does not occur when the output mirror is degraded.

5. The laser machining apparatus as set forth in claim 4, wherein
   the control means includes
   a calculation unit for calculating, based on a beam power value measured by the beam-power measurement means with the laser beam emitted at the low beam power, a beam power value that is expected to be measured by the beam-power measurement means in the case with the laser beam emitted at the high beam power, using a proportionality equation, whereby
   the control means determines the degradation condition of the output mirror in the laser oscillator by setting the calculated beam power value in the calculation unit as the criterion value, and by comparing the criterion value with the beam power value measured by the beam-power measurement means with the laser beam emitted at the high beam power.

6. The laser machining apparatus as set forth in claim 1, wherein an opening diameter of the aperture is equal to or less than sixty percent of a diameter of the laser beam.

7. The laser machining apparatus as set forth in claim 1, wherein
   when the laser oscillator emits a pulsed laser beam,
   at least one value of a pulse frequency, a pulse width and pulse peak power of the laser beam is changed so as to change beam power thereof at a time when the beam power of the laser beam is measured for determining the degradation condition of the output mirror in the laser oscillator.

8. The laser machining apparatus as set forth in claim 1, wherein
   when the laser oscillator emits a continuous laser beam,
   beam power of the laser beam is changed at a time when the beam power of the laser beam is measured for determining the degradation condition of the output mirror in the laser oscillator.

9. The laser machining apparatus as set forth in claim 1, further comprising a means for introducing the aperture and the beam-power measurement means into a light path of the laser beam emitted from the laser oscillator at a time when the degradation condition of the output mirror is measured, and for removing them from the light path when laser machining is performed.

10. The laser machining apparatus as set forth in claim 1, wherein the aperture is also used when laser machining is performed.

11. The laser machining apparatus as set forth in claim 1, wherein no optical component causing thermal lensing is placed in a light path of the laser beam between the laser oscillator and the aperture.

12. The laser machining apparatus as set forth in claim 1, wherein
   the control means comprises
   a determination criterion value for determining that the output mirror is degraded, and a warning criterion value defined lower than the determination criterion value, for determining that degradation timing for the output mirror is approaching.

13. A laser machining apparatus, comprising:
   a laser oscillator for emitting a laser beam;
   an optical component, placed in a light path of the laser beam that is emitted from the laser oscillator, for transmitting the laser beam;
   an aperture, placed in a light path of the laser beam transmitted through the optical component, for blocking a perimeter portion of the laser beam and for transmitting a middle portion thereof;
   a beam-power measurement means for measuring beam power of a laser beam transmitted through the aperture; and
   a control means for determining a degradation condition of the optical component, based on the beam power value measured by the beam-power measurement means when the laser beam is emitted with a predetermined beam power,
   wherein the predetermined beam power is a beam power with a level at which a thermal lens effect occurs when the optical component is degraded, and
   wherein the control means determines the degradation condition output at the predetermined beam power based on comparing the beam power measured by the beam-power measurement means with a criterion value.

14. The laser machining apparatus as set forth in claim 13, wherein the predetermined beam power is high beam power.

15. The laser machining apparatus as set forth in claim 14, wherein the control means includes a memory unit for storing, as the criterion value, beam power value separately measured by the beam-power measurement means using a non-degraded optical component with the laser beam emitted at the high beam power, and
   wherein the control means determines the degradation condition of the optical component by comparing the criterion value stored in the memory unit with the measured beam power value.

16. The laser machining apparatus as set forth in claim 14, wherein the predetermined beam power further includes low beam power with a level at which a thermal lens effect does not occur when the optical component is degraded.

17. The laser machining apparatus as set forth in claim 16, wherein
   the control means includes
   a calculation unit for calculating, based on a beam power value measured by the beam-power measurement means with the laser beam emitted at the low beam power, a beam power value that is expected to be measured by the beam-power measurement means in the case with the laser beam emitted at the high beam power, using a proportionality equation, whereby
   the control means determines the degradation condition of the optical component by setting the calculated beam power value in the calculation unit as a criterion value, and by comparing the criterion value with the beam power value measured by the beam-power measurement means with the laser beam emitted at the high beam power.

18. A method of determining degradation of an output mirror in a laser oscillator, comprising the steps of:

emitting a laser beam having high beam power with a level at which a thermal lens effect occurs in a degraded output mirror in the laser oscillator;

measuring a beam power value of the laser beam emitted at the high beam power and transmitted through an aperture, placed in a light path of the laser beam, for blocking a perimeter portion of the laser beam and for transmitting a middle portion thereof; and determining a degradation condition of the output mirror in the laser oscillator, based on a criterion value and the measured beam power value.

19. The method of determining degradation of an output mirror in a laser oscillator as set forth in claim 18, wherein the criterion value is provided by the steps of measuring, using a non-degraded output mirror in the laser oscillator, the beam power value of the laser beam emitted at the high beam power and transmitted through the aperture, and storing the measured beam power value as the criterion value.

20. A method of determining degradation of an output mirror in a laser oscillator, comprising the steps of:

emitting a laser beam having low beam power with a level at which a thermal lens effect does not occur in a degraded output mirror in the laser oscillator;

measuring a beam power value of the laser beam emitted at the low beam power and transmitted through an aperture that is placed in a light path of the laser beam so as to block a perimeter portion of the laser beam and to transmit a middle portion thereof;

emitting a laser beam having high beam power with a level at which a thermal lens effect occurs in the degraded output mirror in the laser oscillator;

measuring a beam power value of the laser beam emitted at the high beam power and transmitted through the aperture;

calculating, based on the measured beam power value when the laser beam with the low beam power is emitted, a beam power value when the laser beam with the high beam power is emitted using a non-degraded output mirror in the laser oscillator, using a proportionality equation; and determining a degradation condition of the output mirror, based on the calculated beam power value and the measured beam power value when the laser beam is emitted with the high beam power.

21. A laser machining apparatus, comprising:

a laser oscillator for emitting a laser beam;

an aperture, placed in a light path of the laser beam emitted from the laser oscillator, for blocking a perimeter portion of the laser beam and for transmitting a middle portion thereof;

a beam-power measurement means for measuring beam power of a laser beam transmitted through the aperture;

a control means for determining a degradation condition of an output mirror in the laser oscillator, based on the beam power value measured by the beam-power measurement means when the laser beam is emitted with predetermined beam power; and a machining control device which controls the laser oscillator based on the degradation condition determined by the control means.

22. A laser machining apparatus, comprising:

a laser oscillator for emitting a laser beam;

an aperture, placed in a light path of the laser beam emitted from the laser oscillator, for blocking a perimeter portion of the laser beam and for transmitting a middle portion thereof;

a beam-power measurement means for measuring beam power of a laser beam transmitted through the aperture;

a control means for determining a degradation condition of an output mirror in the laser oscillator, based on the beam power value measured by the beam-power measurement means when the laser beam is emitted with predetermined beam power; and a means for introducing the aperture and the beam-power measurement means into a light path of the laser beam emitted from the laser oscillator at a time when the degradation condition of the output mirror is measured, and for removing them from the light path when laser machining is performed.

* * * * *